US007749082B2

(12) United States Patent
Dunaevsky et al.

(10) Patent No.: US 7,749,082 B2
(45) Date of Patent: Jul. 6, 2010

(54) METHOD FOR USING THREE CROSS-INTERACTIVE PLAYING BOARDS TO PLAY GAME OF CHANCE

(75) Inventors: Vladimir Dunaevsky, Toronto (CA); Justin Lucas Thouin, Toronto (CA)

(73) Assignee: Cryptologic Inc., Toronto (CA)

( * ) Notice: Subject to any disclaimer, the term of this patent is extended or adjusted under 35 U.S.C. 154(b) by 372 days.

(21) Appl. No.: 11/464,663

(22) Filed: Aug. 15, 2006

(65) Prior Publication Data

US 2008/0045303 A1 Feb. 21, 2008

(51) Int. Cl.
*A63F 9/24* (2006.01)
*A63F 13/00* (2006.01)
*G06F 17/00* (2006.01)
*G06F 19/00* (2006.01)

(52) U.S. Cl. .............................. 463/32; 463/1; 463/16; 463/17; 463/18; 463/19; 463/20; 463/30; 463/31

(58) Field of Classification Search .................... 463/42
See application file for complete search history.

(56) References Cited

U.S. PATENT DOCUMENTS

| | | | | |
|---|---|---|---|---|
| 4,863,172 A * | 9/1989 | Rosenwinkel et al. | 273/153 S |
| 6,746,329 B1 * | 6/2004 | Duhamel | 463/20 |
| 2003/0130025 A1 * | 7/2003 | Gilmore et al. | 463/16 |
| 2004/0043809 A1 * | 3/2004 | Gomez et al. | 463/16 |

FOREIGN PATENT DOCUMENTS

WO WO 2006039324 A2 * 4/2006

OTHER PUBLICATIONS

Bejeweled Deluxe Readme, May 30, 2001, PopCap Games, Inc. <http://www.popcap.com/faqbejeweled/1033/pc/readme.html>.*

Cubes Invasion (screenshots of How to Play screens), Sep. 8, 2004, Sugar Games [date as shown by Exhibit A].*

Exhibit A: Cubes Invasion 1.0, Apr. 5, 2005, Sugar Games <http://web.archive.org/web/20050405203711/http://www.sugargames.com/cubesinvasion/>.*

Exhibit B: PopCap Games—Bejeweled (Screenshot), May 25, 2005, PopCap Games, Inc. <http://web.archive.org/web/20050525171935/www. popcap.com/launchpage.php?theGame=bejeweled &src=gamestack>.*

(Continued)

*Primary Examiner*—John M Hotaling
*Assistant Examiner*—Werner Garner
(74) *Attorney, Agent, or Firm*—Bereskin & Parr LLP/S.E.N.C.R.L., s.r.l.

(57) ABSTRACT

An apparatus and method for playing a version of a video game is provided. Using a computer terminal connected to a network, a player places a bet. Three faces of a three-dimensional cube are displayed. Each face includes $N^2$ squares arranged in a N×N arrangement. One of an ordinary symbol, a multiplier symbol, or a bomb symbol is displayed in each of the squares. The computer determines whether any winning combinations are present, and provides a credit to the player according to the winning combination. When either a winning combination or a bomb symbol is present, certain squares are eliminated. Eliminated squares are refilled by shifting the remaining squares and then randomly generating new symbols. The game continues until there are no winning combinations and no bomb symbols.

30 Claims, 27 Drawing Sheets

OTHER PUBLICATIONS

Exhibit C: Astraware: Bejeweled, Mar. 7, 2005, Astraware <http://web.archive.org/web/20050307094528/www.astraware.com/all/featured/bejeweled/>.*

FAQ's—Game Fairness and Credibility at the Online Casino, Oct. 27, 2005, VIP Casino <http://web.archive.org/web/20051027081814/www.vipcasino.com/help/faqs/fairness.shtml>.*

Bittencourt, Ricardo, Tetrinet, Sep. 27, 2004 <http://www.700km.com.br/mundobizarro/tetrinet.php>.*

Joystick-To-Mouse Frequently Asked Questions, Jun. 17, 2005, IMG <http://web.archive.org/web/20050617235838/www.imgpresents.com/joy2mse/jtmfaq.htm>.*

* cited by examiner

METHOD FOR USING THREE CROSS-INTERACTIVE PLAYING BOARDS TO PLAY GAME OF CHANCE

BACKGROUND OF THE INVENTION

1. Field of the Invention

The present invention relates generally to a video game. More particularly, the present invention relates to a video game using three cross-interactive playing boards and intended for online play on a computer network.

2. Related Art

Video games have been played for many years by recreational players. Often, video games are played at arcades or at places of business, such as restaurants or taverns. Video games may also be played on home video systems, or on personal computers. More recently, video games have been widely played on computers that are connected to a network such as the Internet.

In recent years, gambling has become popular in connection with video games, and also in connection with online computer games. Accordingly, the administration of online computer gambling games has become a lucrative business for some providers.

SUMMARY OF INVENTION

In one aspect, the invention provides an apparatus for enabling a player to play a video game. The apparatus includes an electronic client device which is in communication with a network server. The electronic client device is configured to: a) prompt the player to indicate an amount of a bet; and b) display a three-dimensional cube. The cube includes three mutually orthogonal faces. Each face includes $N^2$ squares arranged in an N×N configuration, wherein N is a whole number greater than 1; in a preferred embodiment, N=5. Each of the squares is selected from the group consisting of an ordinary symbol, a multiplier symbol, and a bomb symbol. The electronic client device is further configured to perform step c, which includes determining which, if any, combinations of squares constitute winning combinations. For each combination determined to be a winning combination, the electronic client device is further configured to perform step d, which includes the following: i) providing a predetermined credit to the player, the amount of the predetermined credit being related to the specific winning combination; ii) eliminating all squares that are part of the winning combination; iii) shifting the remaining squares in a predetermined manner; iv) replacing the empty squares by randomly generating new squares selected from the group consisting of an ordinary symbol, a multiplier symbol, and a bomb symbol; and v) repeating steps c and d. For each bomb symbol, the electronic client device is further configured to perform step e, which includes the following: i) eliminating all squares relating to the bomb symbol; ii) shifting the remaining squares in the predetermined manner; iii) replacing the empty squares by randomly generating new squares selected from the group consisting of an ordinary symbol, a multiplier symbol, and a bomb symbol; and iv) repeating steps c, d, and e. When it is determined that there are no winning combinations and when there are no bomb symbols, the electronic client device is further configured to end the video game.

The three mutually orthogonal faces may include a top-left face, a top-right face, and a bottom face. The top-left face and the bottom face together may form N betting lines, wherein each betting line includes a column of N squares on the top-left face and an adjacent column of N squares on the bottom face. The top-right face and the bottom face together may form N betting lines, wherein each betting line includes a column of N squares on the top-right face and an adjacent column of N squares on the bottom face. The top-left face and the top-right face together may form N betting lines, wherein each betting line includes a row of N squares on the top-left face and an adjacent row of N squares on the top-right face. A combination of at least three consecutive squares within a single betting line having either a same ordinary symbol or a same ordinary symbol and at least one multiplier symbol may constitute a winning combination.

For each of the top-left and top-right faces, the predetermined manner in which the squares are shifted may include a downward shift of each square that is above and in the same column as an eliminated square. For the bottom face, the predetermined manner in which the squares are shifted may include a leftward shift of each square that is to the right of and in the same row as an eliminated square.

When a winning combination includes at least one multiplier symbol, the amount of the predetermined credit may be equal to a sum of the numbers associated with each multiplier symbol within the winning combination multiplied by the amount of the predetermined credit for the corresponding combination of at least three squares having the same ordinary symbol with no multiplier symbols.

Each ordinary symbol may be selected from the group consisting of a red symbol, a yellow symbol, a brown symbol, a blue symbol, a green symbol, an orange symbol, and a purple symbol. Each multiplier symbol may be selected from the group consisting of X1, X2, X3, X4, X5, and X6. Each bomb symbol may be selected from the group consisting of a cross bomb symbol, a field bomb symbol, and a total bomb symbol. A cross bomb symbol may relate to all squares in each of the two betting lines that contain the cross bomb symbol. A field bomb symbol may relate to all squares in the same face that contains the field bomb symbol. A total bomb symbol may relate to all squares in all three faces.

The electronic client device may include a client computer. The client computer may be in communication with the network server via the Internet. The electronic client device may include a client monitor. The monitor may be configured to receive inputs from one or more of a keyboard, a mouse, and a joystick device.

In another aspect, the invention provides a method of conducting a video game over a computer network. The network includes a server computer and at least one client computer that is in communication with the server computer. The method includes configuring the server computer to execute the steps of: a) prompting a user to indicate, via the at least one client computer, an amount of a bet; and b) displaying on the at least one client computer a three-dimensional cube. The cube includes three mutually orthogonal faces. Each face includes $N^2$ squares arranged in an N×N configuration, wherein N is a whole number greater than 1; in a preferred embodiment, N=5. Each of the squares is selected from the group consisting of an ordinary symbol, a multiplier symbol, and a bomb symbol. The method further includes configuring the server computer to execute the steps of: c) determining which, if any, combinations of squares constitute winning combinations; and d) for each combination determined to be a winning combination, i) providing a predetermined credit to the player, the amount of the predetermined credit being related to the specific winning combination; ii) eliminating all squares that are part of the winning combination; iii) shifting the remaining squares in a predetermined manner; iv) replacing the empty squares by randomly generating new squares selected from the group consisting of an ordinary symbol, a multiplier symbol, and a bomb symbol; and v) repeating steps c and d. The method further includes configuring the server computer to execute the steps of: e) for each bomb symbol, i) eliminating all squares relating to the bomb symbol; ii) shifting the remaining squares in the predetermined manner; iii) replacing the empty squares by randomly generating new squares selected from the group consisting of an ordinary symbol, a multiplier symbol, and a bomb symbol; and iv) repeating steps c, d, and e. When it is determined that there are no winning combinations and when there are no bomb symbols, the method further includes configuring the server computer to end the video game.

The three mutually orthogonal faces may include a top-left face, a top-right face, and a bottom face. The top-left face and the bottom face together may form N betting lines, wherein each betting line includes a column of N squares on the top-left face and an adjacent column of N squares on the bottom face. The top-right face and the bottom face together may form N betting lines, wherein each betting line includes a column of N squares on the top-right face and an adjacent column of N squares on the bottom face. The top-left face and the top-right face together may form N betting lines, wherein each betting line includes a row of N squares on the top-left face and an adjacent row of N squares on the top-right face. A combination of at least three consecutive squares within a single betting line having either a same ordinary symbol or a same ordinary symbol and at least one multiplier symbol may constitute a winning combination.

The step of shifting the remaining squares in a predetermined manner may include the following: for each of the top-left and top-right faces, downwardly shifting each square that is above and in the same column as an eliminated square; and, for the bottom face, leftwardly shifting each square that is to the right of and in the same row as an eliminated square.

When a winning combination includes at least one multiplier symbol, the amount of the predetermined credit may be equal to a sum of the numbers associated with each multiplier symbol within the winning combination multiplied by the amount of the predetermined credit for the corresponding combination of at least three squares having the same color with no multiplier symbols.

Each ordinary symbol may be selected from the group consisting of a red symbol, a yellow symbol, a brown symbol, a blue symbol, a green symbol, an orange symbol, and a purple symbol. Each multiplier symbol may be selected from the group consisting of X1, X2, X3, X4, X5, and X6. Each bomb symbol may be selected from the group consisting of a cross bomb symbol, a field bomb symbol, and a total bomb symbol. A cross bomb symbol may relate to all squares in each of the two betting lines that contain the cross bomb symbol. A field bomb symbol may relate to all squares in the same face that contains the field bomb symbol. A total bomb symbol may relate to all squares in all three faces.

The client computer may be in communication with the server computer via the Internet.

DETAILED DESCRIPTION OF THE INVENTION

Figure 1:
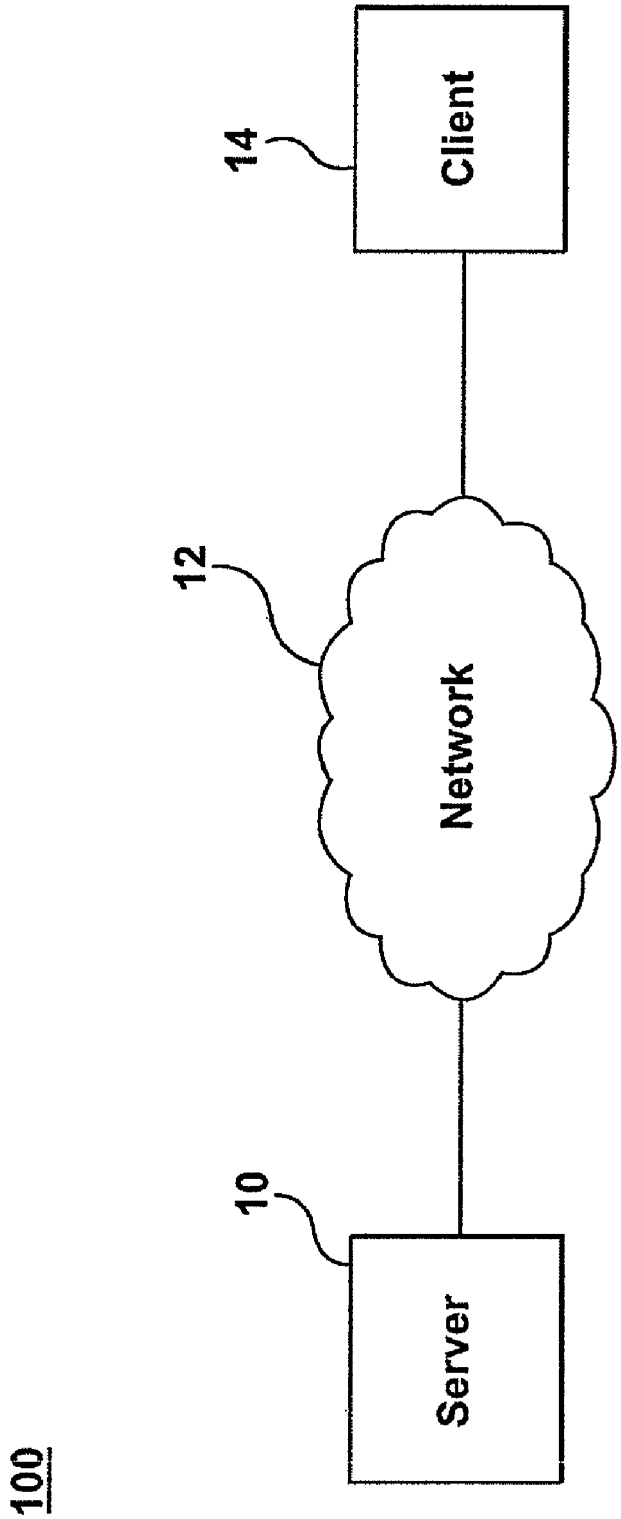
FIG. 1 is a block diagram of an apparatus for enabling a player to play a video game using a networked computer, according to a preferred embodiment of the invention.

The present invention provides an apparatus and a method for enabling a computer user to play a video game. Referring to FIG. 1, according to a preferred embodiment of the invention, the video game is typically played through the use of a system 100. The system 100 includes an electronic client device 14 that is connected to a host server 10 via a network 12. A typical player uses the client device 14 to access the game, which is hosted on the host server 10. The game is implemented electronically by software that is installed on the host server 10.

The host server 10 is preferably implemented by the use of one or more general purpose computers, such as, for example, a Sun Microsystems F15k. The client device 14 is also preferably implemented by the use of one or more general purpose computers, such as, for example, a typical personal computer manufactured by Dell, Gateway, or Hewlett-Packard. Each of the host server 10 and the client device 14 can include a microprocessor. The microprocessor can be any type of processor, such as, for example, any type of general purpose microprocessor or microcontroller, a digital signal processing (DSP) processor, an application-specific integrated circuit (ASIC), a programmable read-only memory (PROM), or any combination thereof. The host server 10 may use its microprocessor to read a computer-readable medium containing software that includes instructions for carrying out one or more of the functions of the host server 10, as further described below.

Each of the host server 10 and the client device 14 can also include computer memory, such as, for example, random-access memory (RAM). However, the computer memory of each of the host server 10 and the client device 14 can be any type of computer memory or any other type of electronic storage medium that is located either internally or externally to the host server 10 or the client device 14, such as, for example, read-only memory (ROM), compact disc read-only memory (CDROM), electro-optical memory, magneto-optical memory, an erasable programmable read-only memory (EPROM), an electrically-erasable programmable read-only memory (EEPROM), or the like. According to exemplary embodiments, the respective RAM can contain, for example, the operating program for either the host server 10 or the client device 14. As will be appreciated based on the following description, the RAM can, for example, be programmed using conventional techniques known to those having ordinary skill in the art of computer programming. The actual source code or object code for carrying out the steps of, for example, a computer program can be stored in the RAM. Each of the host server 10 and the client device 14 can also include a database. The database can be any type of computer database for storing, maintaining, and allowing access to electronic information stored therein. The host server 10 preferably resides on a network 12, such as a local area network (LAN), a wide area network (WAN), or the Internet. The client device 14 preferably is connected to the network 12 on which the host server 10 resides, thus enabling electronic communications between the host server 10 and the client device 14 over a communications connection, whether locally or remotely, such as, for example, an Ethernet connection, an RS-232 connection, or the like.

The client device 14 typically includes a monitor for displaying the actions and status of the video game. The client device 14 may be configured to accept user inputs provided via one or more of a keyboard, a mouse, and a joystick.

Figure 7:
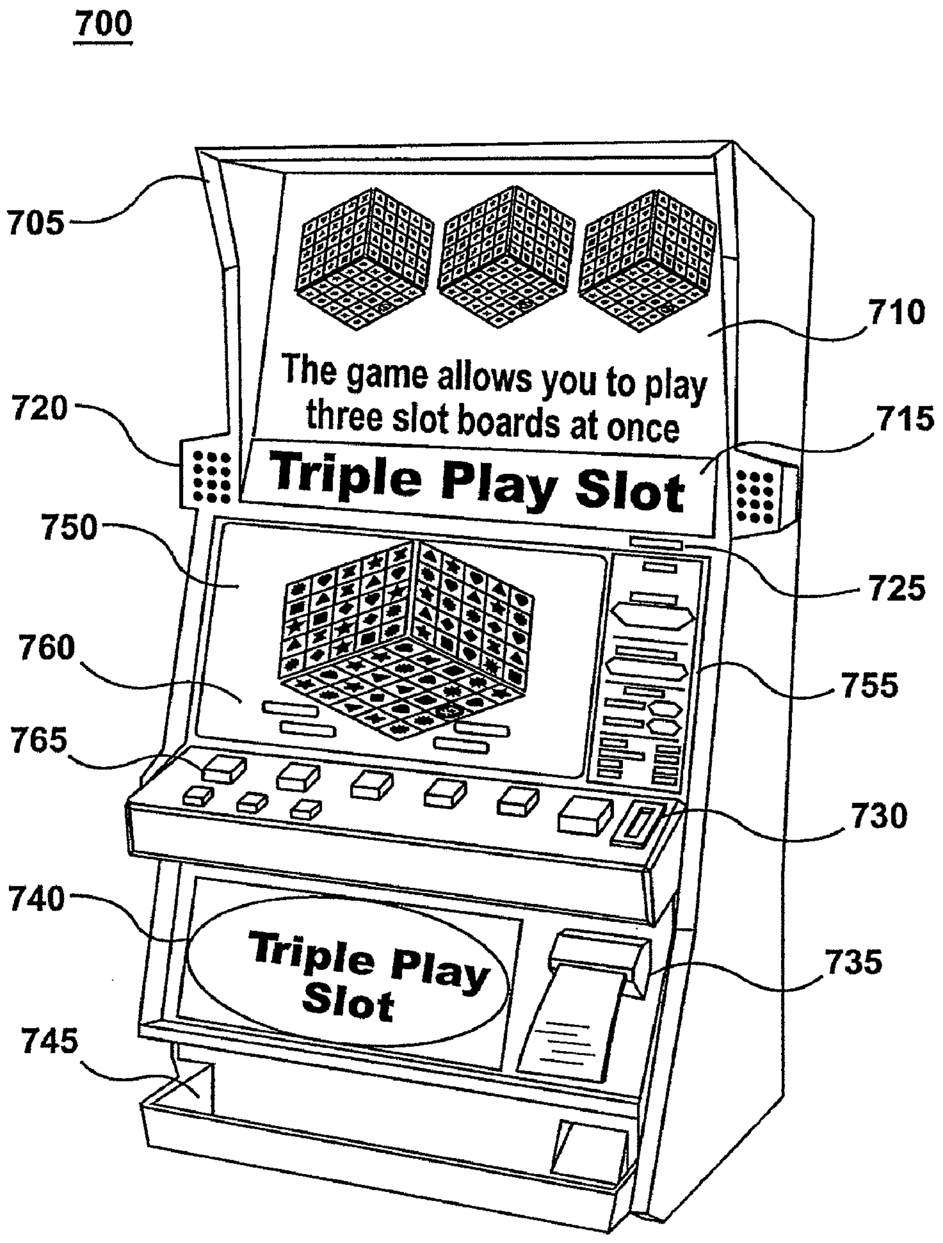
FIG. 7 is an illustration of a conventional stand-alone slot machine device configured for playing a video game according to an embodiment of the invention.
Figure 8A:
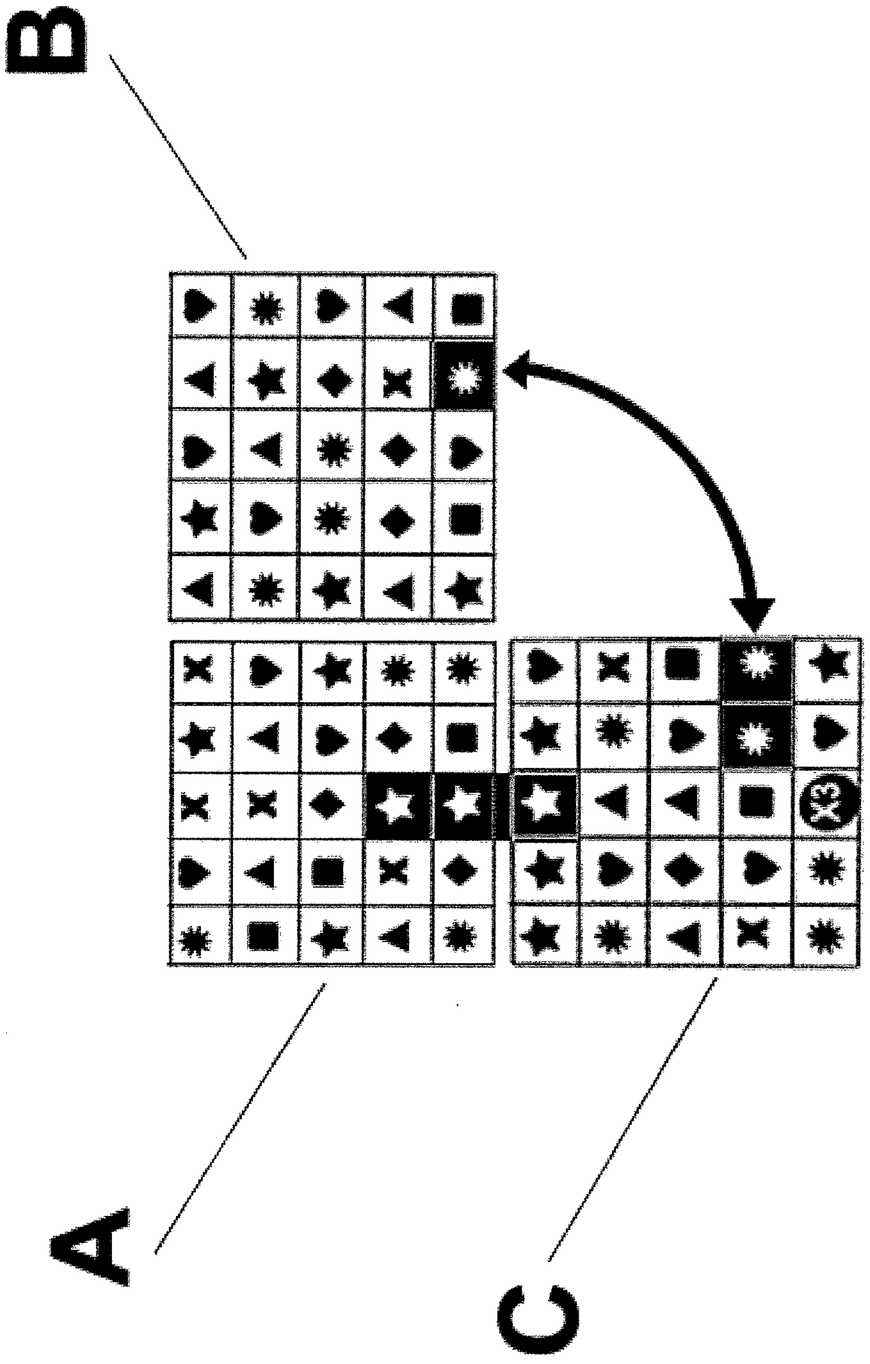
FIGS. 8*a*-8*f* illustrate a process of combining three two-dimensional arrangements of squares into a single cube that shows three mutually orthogonal faces as used in a video game according to a preferred embodiment of the invention.
Figure 8B:
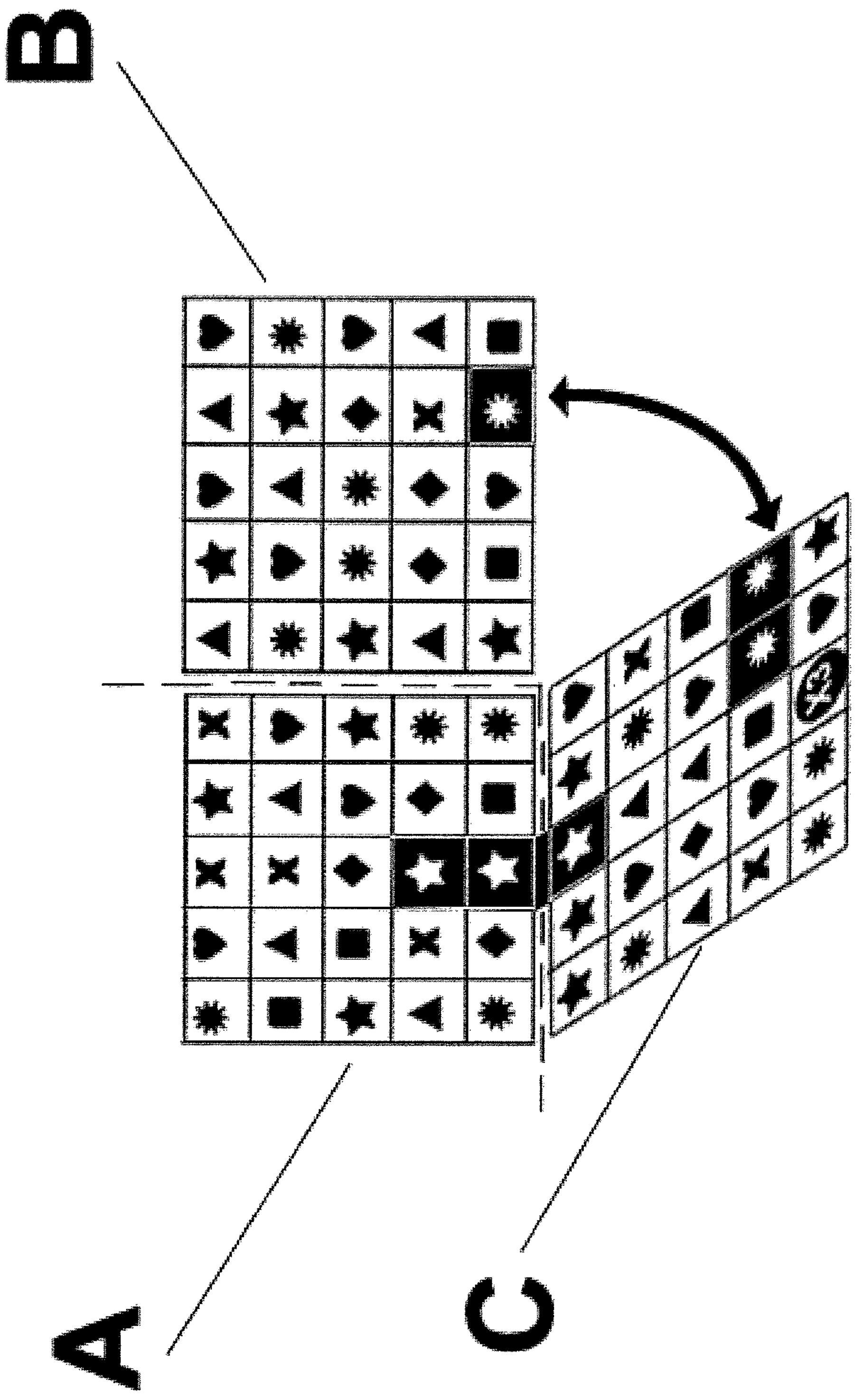
Figure 8C:
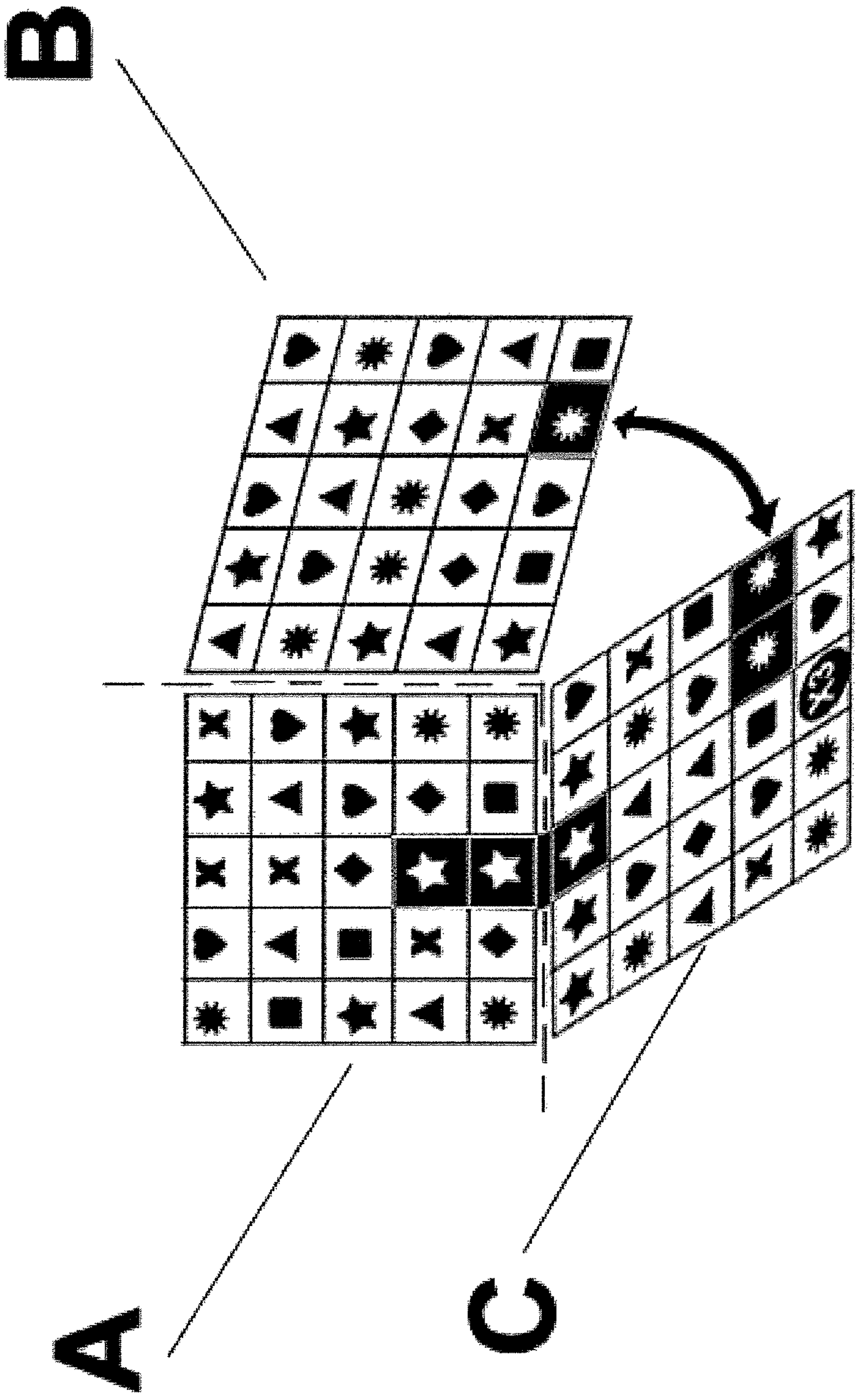
Figure 8D:
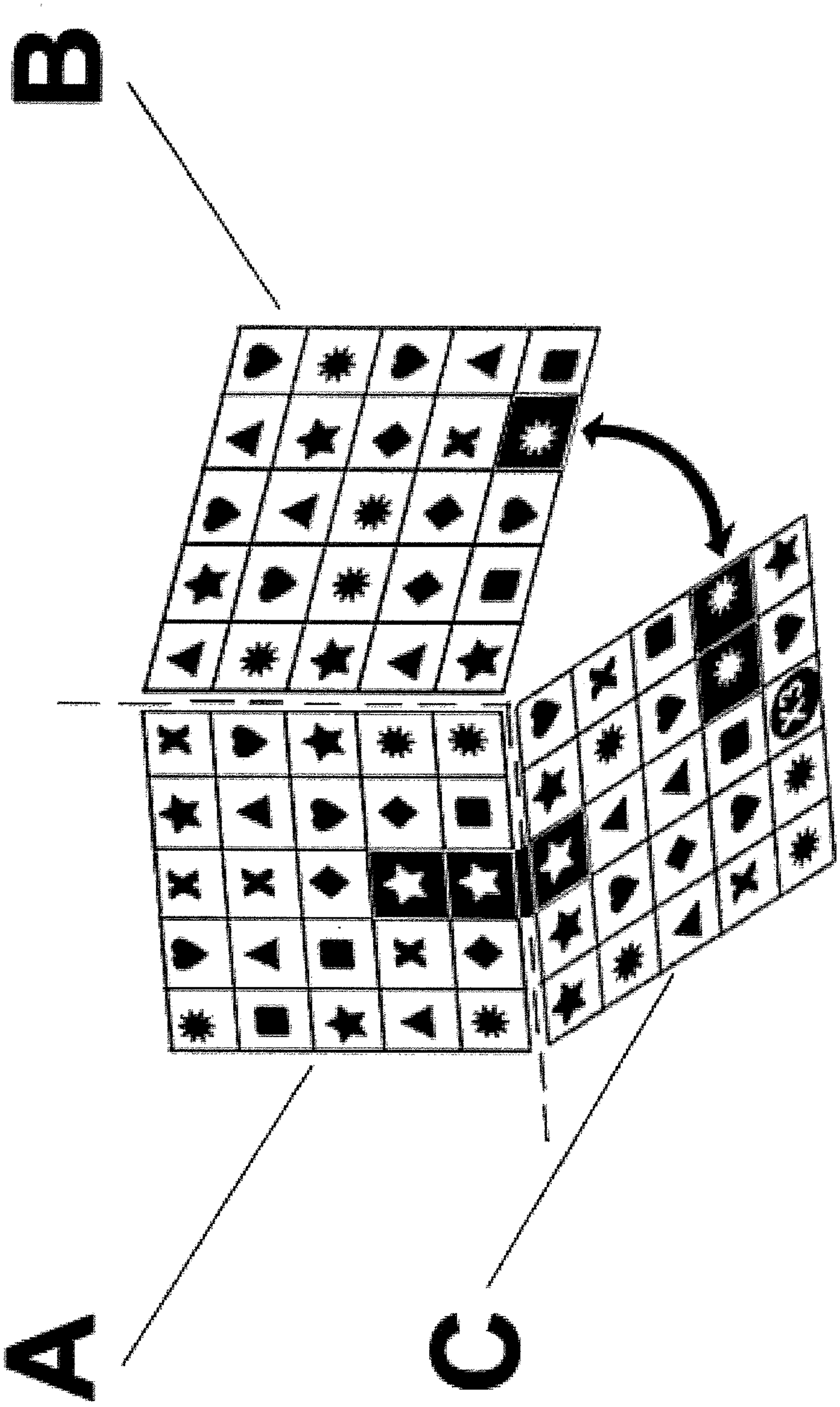
Figure 8E:
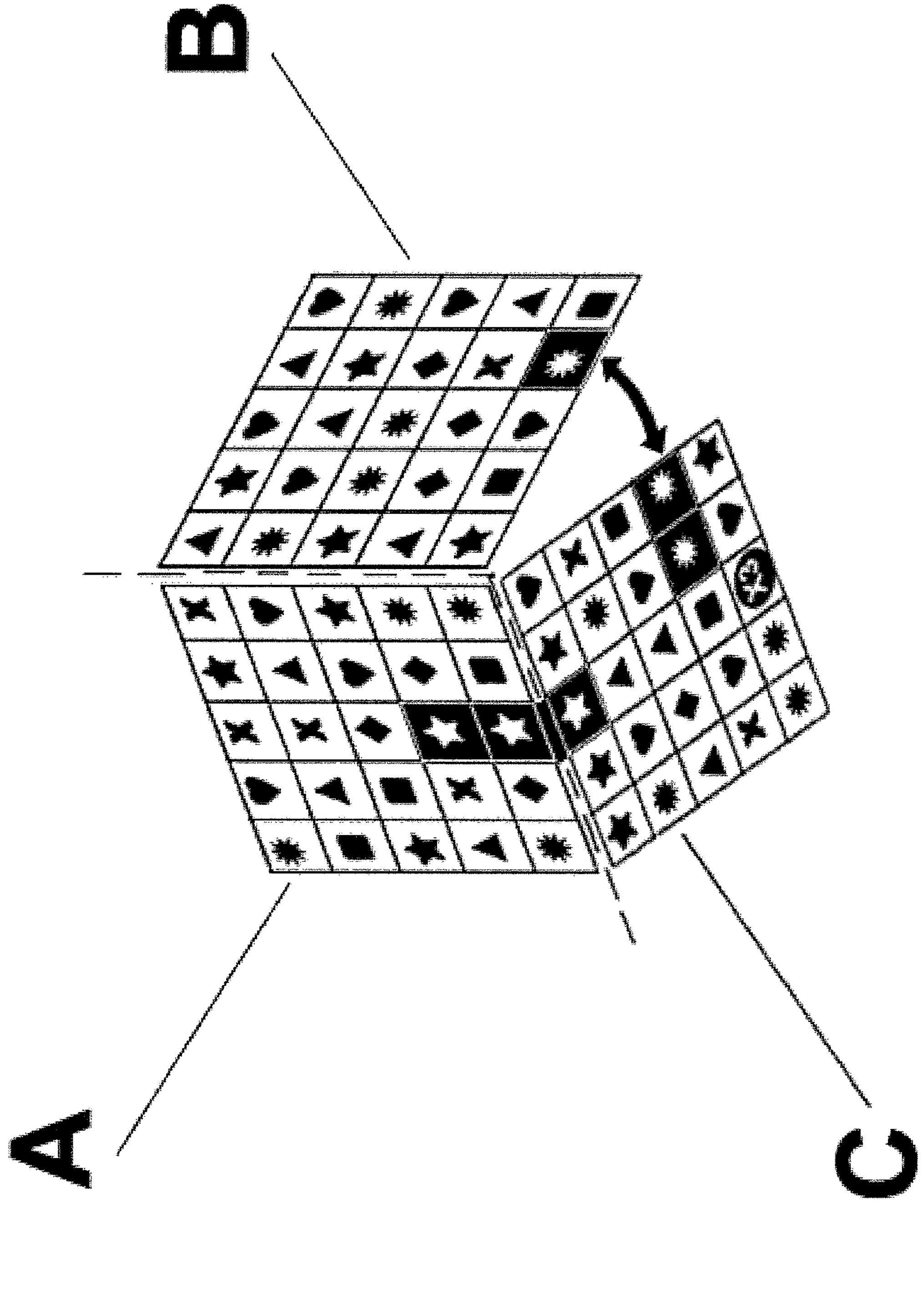
Figure 8F:
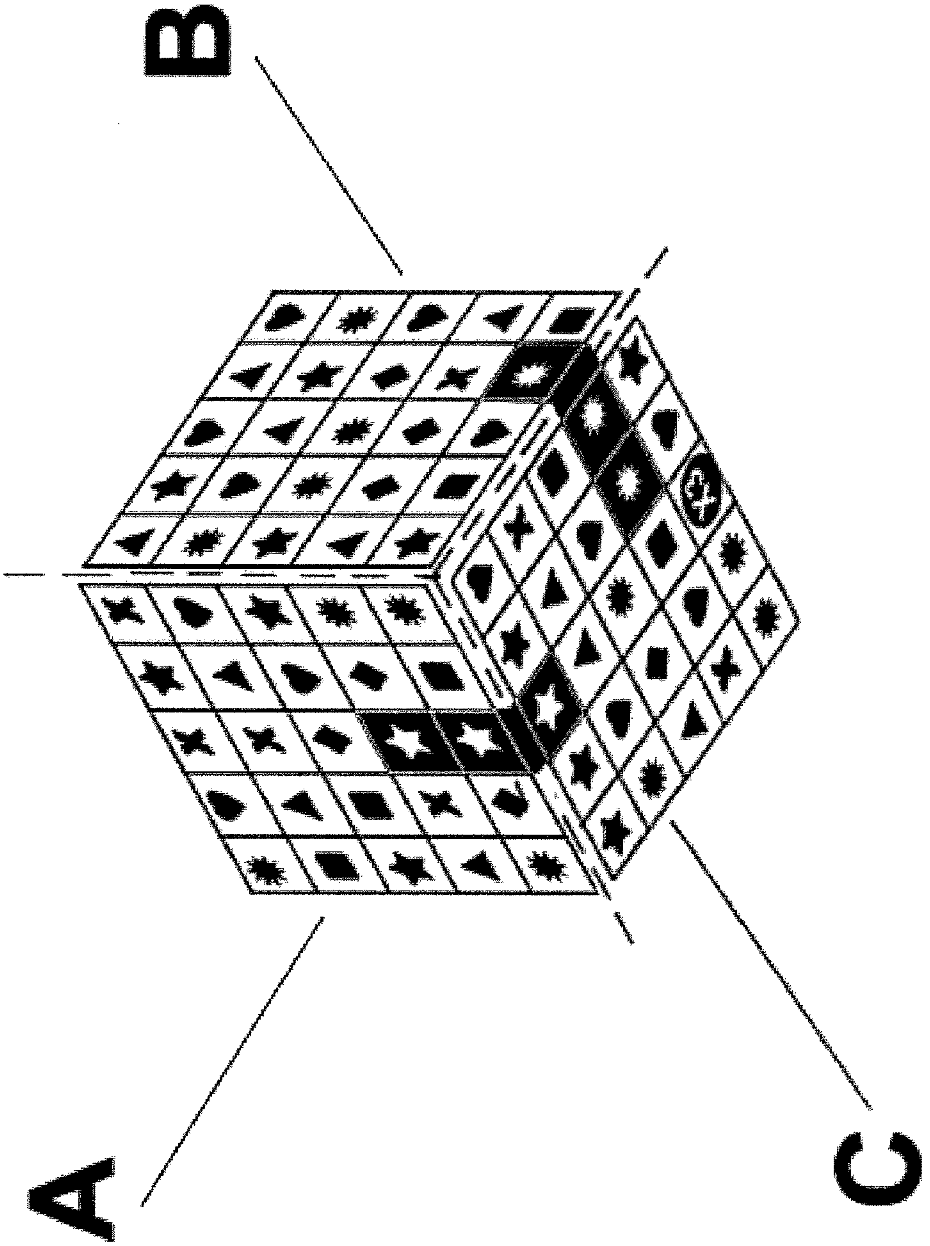

Referring to FIG. 7, in an alternative embodiment, the video game may be played using a conventional stand-alone slot machine device 700. The slot machine 700 is housed in a cabinet 705. The slot machine includes a reference plate 710 that identifies the type of game played on the slot machine 700; a name plate 715; speakers 720; a bill acceptor 725; a coin slot 730; a ticket slot 735 for coinless play; belly art 740; and a coin tray 745. For playing the video game, the slot machine 700 includes a video display 750; game playing instructions 755; touch screen buttons 760; and game function buttons 765.

Figure 2:
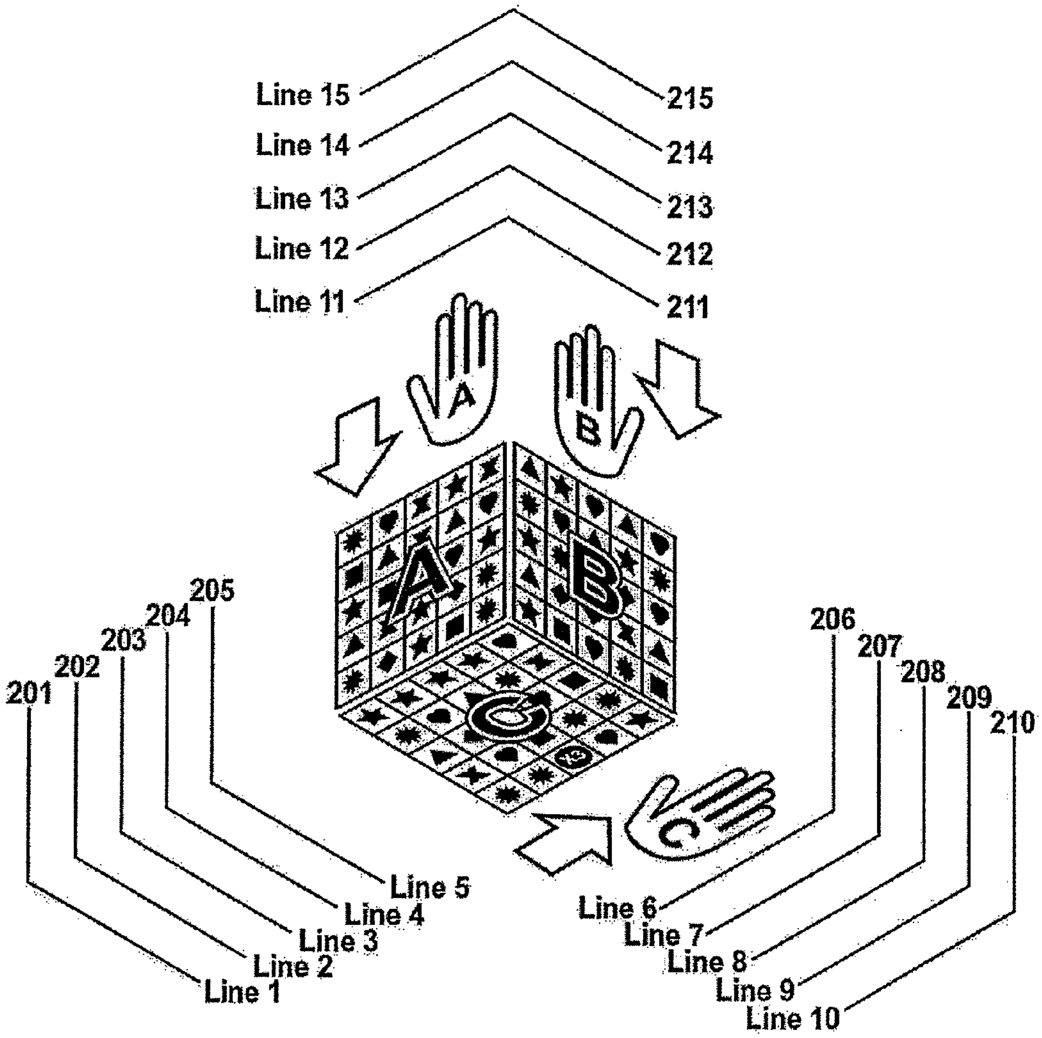
FIG. 2 is an exemplary display of a cube that illustrates three mutually orthogonal faces, each having a five-by-five arrangement of squares such that there are 15 lines of 10 squares each, according to a preferred embodiment of the invention.

Referring to FIG. 2, an exemplary display of a game cube according to a preferred embodiment of the invention is shown. The cube includes three mutually orthogonal faces. Referring also to FIGS. 8*a*-8*f*, the three mutually orthogonal faces may be viewed as three five-by-five arrangements of squares that are oriented in a two-dimensional L shape with respect to one another such that they can be rotated about the axes between the pairs of arrangements to form a three-dimensional cube. The face at the top left is labeled A; the face at the top right is labeled B; and the face at the bottom is labeled C. Each of the three faces A, B, and C includes a five-by-five arrangement of squares. Additionally, the faces are configured such that there are 15 lines, hereinafter referred to as betting lines, of ten squares each. In this manner, each of the 75 squares is included in exactly two betting lines. For example, faces A and C are configured so that betting lines 201, 202, 203, 204, and 205 are formed, each having ten squares. Similarly, faces B and C are configured so that betting lines 206, 207, 208, 209, and 210 are formed; and faces A and B are configured so that betting lines 211, 212, 213, 214, and 215 are formed.

Importantly, although the exemplary embodiment of FIGS. 2 and 8*a*-8*f* illustrates a game cube having three five-by-five arrangements of squares, the present invention enables the use of three N×N arrangements of squares, where N is equal to any whole number greater than one. So, for example, in addition to five-by-five arrangements of squares, the present invention contemplates the use of 2×2 arrangements, 3×3 arrangements, 4×4 arrangements, 6×6 arrangements, 7×7 arrangements, 8×8 arrangements, or any other greater value for N. Accordingly, the present invention is not limited to the use of 5×5 arrangements of squares. However, for simplicity and for illustrative purposes in the discussion below, it will generally be assumed that an exemplary embodiment of 5×5 arrangements is being used.

Figure 3:
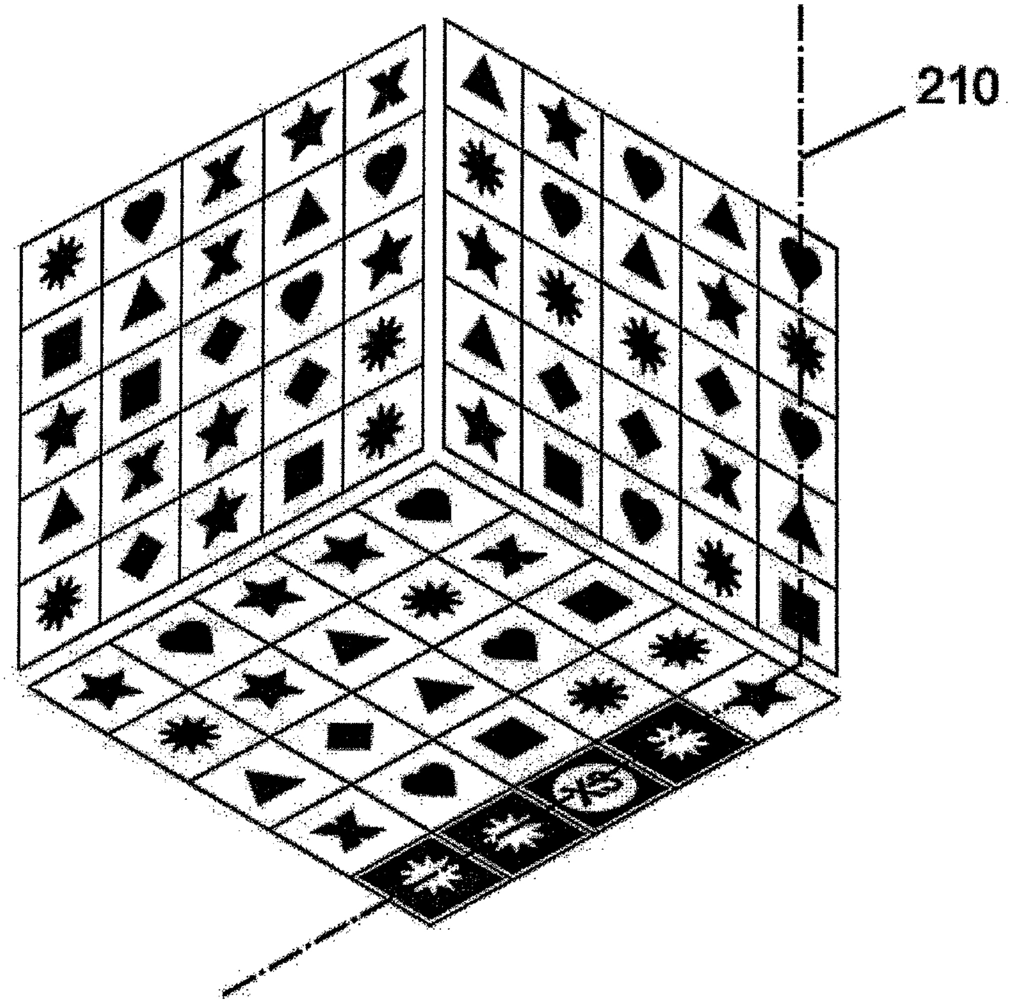
FIG. 3 is an exemplary display of a game cube that illustrates a winning combination that each includes a multiplier symbol, according to a preferred embodiment of the invention.

At the beginning of a game, each of the 75 squares will contain a symbol. Each symbol belongs to one of three categories: 1) an ordinary symbol; 2) a multiplier symbol; or 3) a "bomb" symbol. The symbols are randomly generated in accordance with a predetermined likelihood for each symbol. Bomb symbols may be indicated, for example, by graphical depictions of bombs, or, referring also to FIGS. 5*a*-5*f*, by symbols such as "B1", "B2", . . . "Bn", where n is the number of specific types of bomb symbol. In the latter example, the capitalized B indicates a bomb symbol, and the accompanying number identifies which type of bomb symbol. Similarly, multiplier symbols may be indicated, for example, by symbols such as "X1", "X2", . . . "Xm", where m is the number of specific types of multiplier symbols. Alternatively, a graphical indicator, such as a face of a die, may be used as a multiplier symbol; in this instance, the multiplication factor is indicated by the number showing on the face of the die. Ordinary symbols may include virtually any type of symbol. For example, a set of colored squares may be used as ordinary symbols. As another example, as shown in FIG. 3, ordinary symbols may be indicated by using standard symbols such as sun symbols, heart symbols, cross ("x") symbols, star symbols, triangle symbols, square symbols, and diamond symbols.

Table 1 below illustrates an exemplary a priori probability chart for each of the symbol types discussed above, including ordinary symbols (referred to by color or as a "diamond" symbol), three types of bomb symbols, and multiplier symbols. In a preferred embodiment, the multiplier symbols are equally likely to appear as any of six multipliers (i.e., X1, X2, X3, X4, X5, X6).

TABLE 1

Symbol frequencies
SYMBOL FREQUENCY TABLE

| # | Symbol colour or type | Total numbers |
|---|---|---|
| 1 | Diamond | 240 |
| 2 | Green | 400 |
| 3 | Blue | 500 |
| 4 | Purple | 600 |
| 5 | Red | 700 |
| 6 | Orange | 700 |
| 7 | Yellow | 1400 |
| 8 | Cross Bomb | 2 |
| 9 | Face Bomb | 2 |
| 10 | Total Bomb | 1 |
| 11 | Bonus Multiplier (may be in any of 6 positions) | 60 |
| | Total | 4605 |

Thus, in the example illustrated in Table 1, there are eleven different symbol types, and the bonus multiplier symbol may be in any of six positions. The symbol having the highest frequency is yellow, for which there are 1400 possible appearances out of the 4605 total symbols. Thus, for any given square on a game cube, the likelihood that a yellow symbol is displayed is 1400/4605=0.3040, or 30.40%. The respective probabilities for each symbol type can be computed similarly: The likelihood that a red symbol is displayed on a given square is 700/4605=15.20%; the likelihood that an orange symbol is displayed on a given square is 700/4605=15.20%; the likelihood that a purple symbol is displayed on a given square is 600/4605=13.03%; the likelihood that a blue symbol is displayed on a given square is 500/4605=10.86%; the likelihood that a green symbol is displayed on a given square is 400/4605=8.69%; the likelihood that a diamond symbol is displayed on a given square is 240/4605=5.21%; the likelihood that a cross bomb symbol is displayed on a given square is 2/4605=0.04%; the likelihood that a face bomb symbol is displayed on a given square is 2/4605=0.04%; and the likelihood that a total bomb symbol is displayed on a given square is 1/4605=0.02%. The likelihood that a bonus multiplier symbol is displayed on a given square is 60/4605=1.30%, where each of the six possible positions has a likelihood of 10/4605=0.22%.

Figure 4:
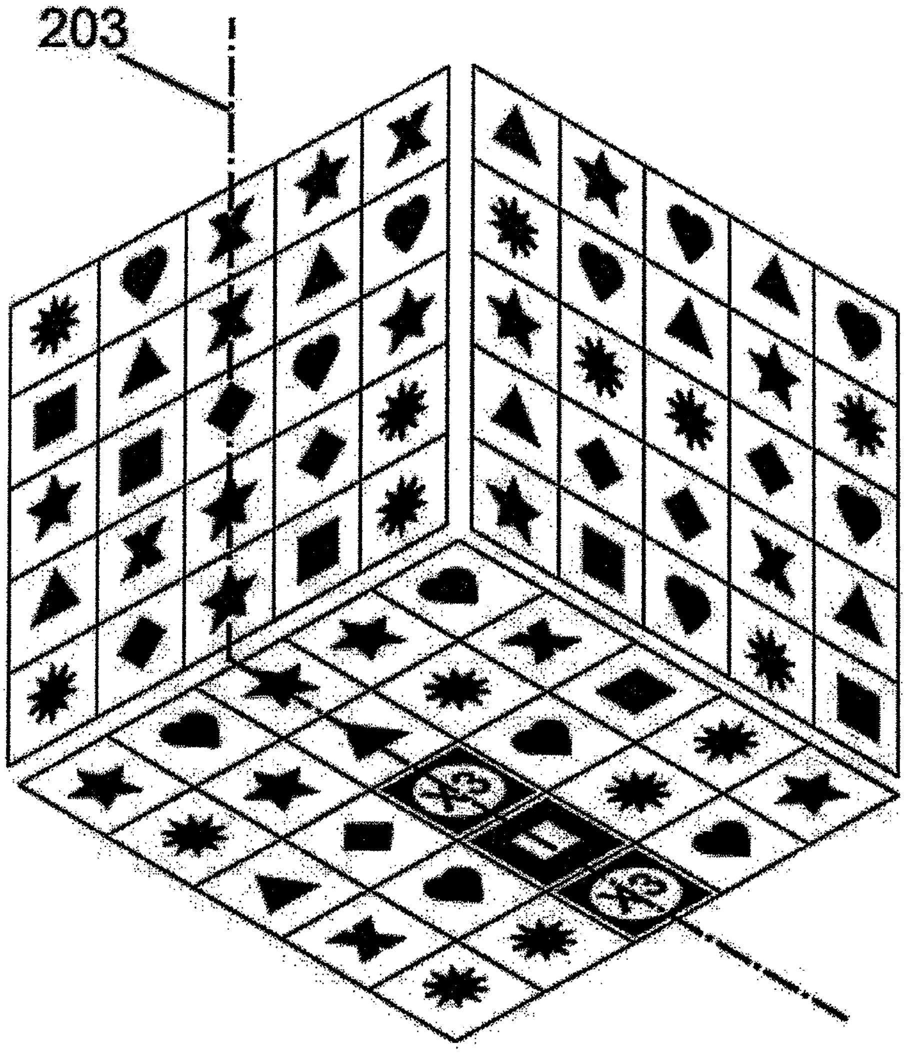
FIG. 4 is an exemplary display of a game cube that includes a single winning combination having two multiplier symbols, according to a preferred embodiment of the invention.

Referring to FIGS. 3 and 4, in a preferred embodiment, a winning combination is deemed to occur whenever a string of at least three consecutive squares within a single betting line includes squares having either all the same ordinary symbol or all the ordinary symbol plus at least one multiplier symbol. In a preferred embodiment, any multiplier symbol acts as a "wild card" type of symbol; i.e., it may be used as a substitute for any ordinary symbol, and it may act as more than one ordinary symbol for different combinations of squares. For example, in FIG. 3, a game cube is shown. 74 of the 75 symbols on the game cube are ordinary symbols, including sun symbols, heart symbols, x symbols, star symbols, triangle symbols, square symbols, and diamond symbols. There is one multiplier symbol, indicated by the "X3" notation. There is a single group of four squares in a single betting line that is highlighted in the bottom row of the bottom face of the game cube (i.e., betting line 210 within face C). This particular group of four squares includes three sun symbols and the X3 multiplier symbol, which is treated as being a fourth sun symbol in this situation. Thus, in FIG. 3, there is at least one winning combination: a four-sun combination.

In FIG. 4, face C includes a three-square combination that has two multiplier symbols with a single square symbol in between the two multiplier symbols. In this instance, it is advantageous to use both multiplier symbols as substitutes for square symbols. Thus, in FIG. 4, there is at least one winning combination: a three-square combination.

In a preferred embodiment, there is a table of relative payouts for different combinations. Table 2 below provides an example of such payouts for a game having the symbol frequency chart of Table 1. Typically, the size of the payout is related to the relative frequency of the type of ordinary symbol and also to the number of squares in the combination. Thus, some types of ordinary symbols may be more or less likely to occur than others, based on the predetermined likelihood used in randomly generating the symbols at the outset of the game; therefore, in general, the less likely the ordinary symbol, the greater the payout for any combination that includes that ordinary symbol. Also, the longer the consecutive string of squares that has the same color, the greater the payout.

TABLE 2

| | Payouts by Winning Combination | | | | | | | |
|---|---|---|---|---|---|---|---|---|
| | 10 | 9 | 8 | 7 | 6 | 5 | 4 | 3 |
| Wilds Only | 10,000 | | | | | | | |
| Diamond | 4000 | 3000 | 2500 | 2000 | 1500 | 1000 | 100 | 50 |
| Green | 3000 | 2500 | 2000 | 1500 | 1000 | 200 | 25 | 10 |
| Blue | 2500 | 2000 | 1000 | 500 | 250 | 60 | 15 | 5 |
| Purple | 2000 | 1000 | 500 | 200 | 100 | 25 | 10 | 3 |
| Red | 1000 | 500 | 200 | 100 | 50 | 10 | 5 | 2 |
| Orange | 1000 | 500 | 200 | 100 | 50 | 10 | 5 | 2 |
| Yellow | 500 | 250 | 100 | 50 | 20 | 5 | 2 | 1.5 |

Thus, for example, using Table 2 above, if a player has placed a wager of $5 on a particular game, and then the video game cube has one winning combination which is a row of five diamond symbols, the player wins 1000*$5=$5000. If the player has placed a wager of $5 on the game and then the video game cube has two winning combinations, one being a row of three orange symbols and one being a row of four purple symbols, the player wins 2*$5+10*$5=$10+$50=$60.

In addition, in a preferred embodiment, the multiplier symbols may be used as payout multipliers, based on the number of the multiplier on the respective multiplier symbol. If more than one multiplier symbol is included in a single winning combination, the numbers of the multipliers may be added together or multiplied together to form the payout multiplier for that combination. So, in FIG. 3, because the multiplier symbol for the highlighted winning combination is an "X3", the payout to that player may be equal to three times the nominal payout for a four-sun combination. In FIG. 4, because there are two multiplier symbols in the same winning combination, and because the sum of the multiplier numbers on those two multiplier symbols is six, therefore, the payout to that player may be equal to six times the nominal payout for a three-square combination. Alternatively, because the product of the multiplier numbers on those two multiplier numbers is nine, therefore, the payout to that player may be equal to nine times the nominal payout for a three-square combination. The player is credited with a payout for each winning combination, based on the amount of the original bet, the nominal payout for the specific winning combination, and the payout multiplier if applicable.

Figure 9A:
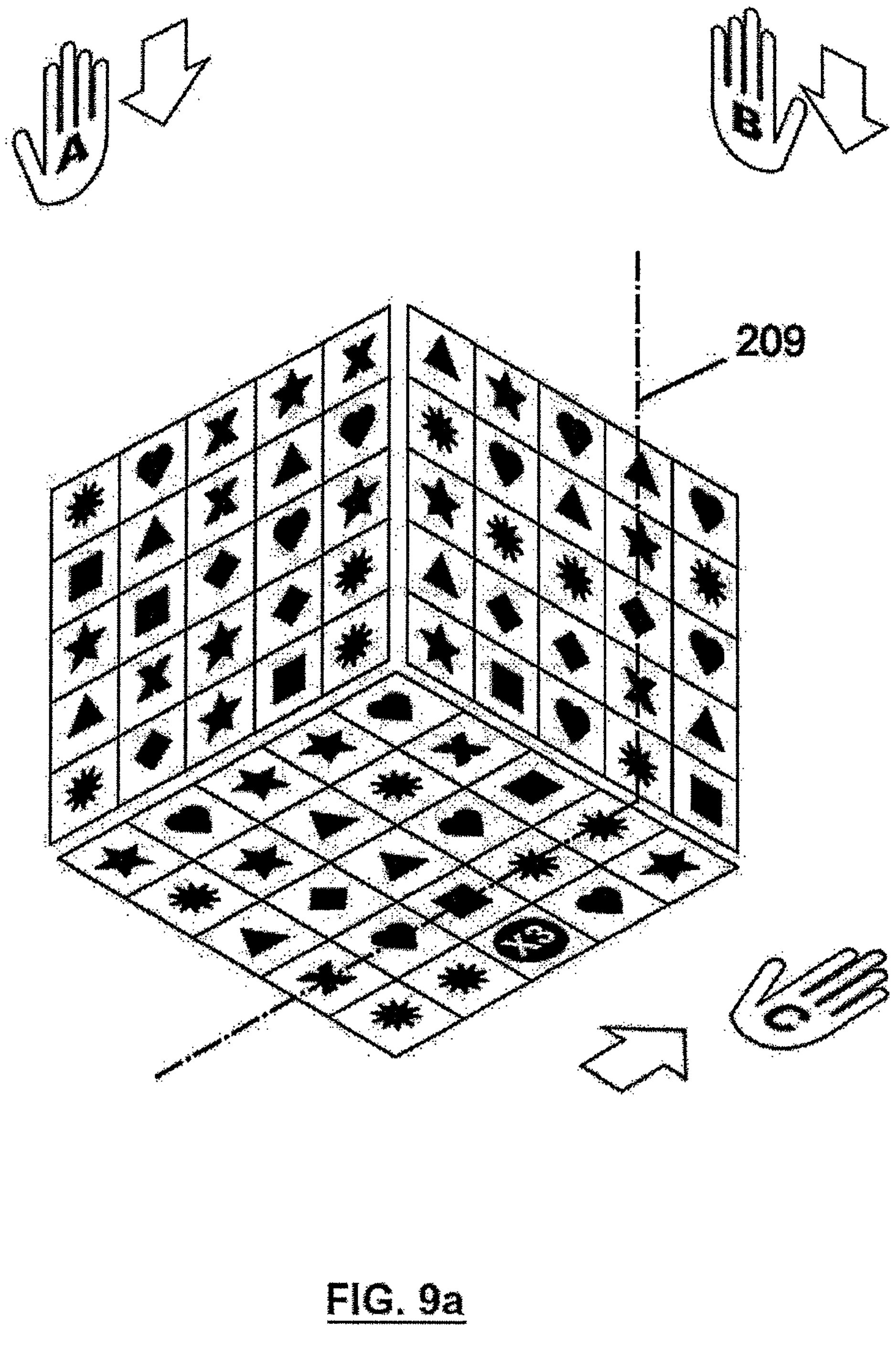
FIGS. 9*a*-9*i* illustrate a set of exemplary shifts of rows or columns of squares after elimination of winning combinations during play of a video game according to a preferred embodiment of the invention.
Figure 9B:
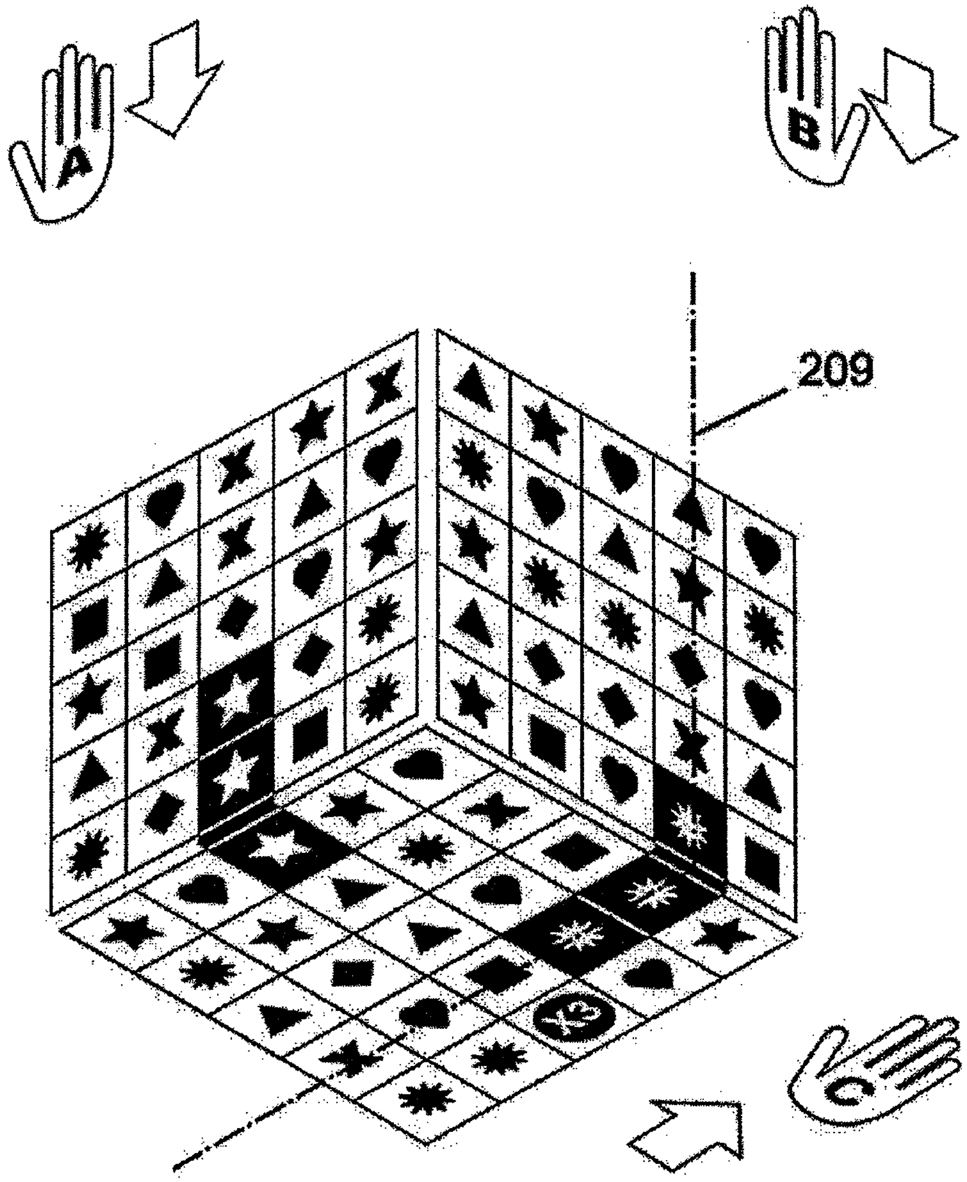
Figure 9C:
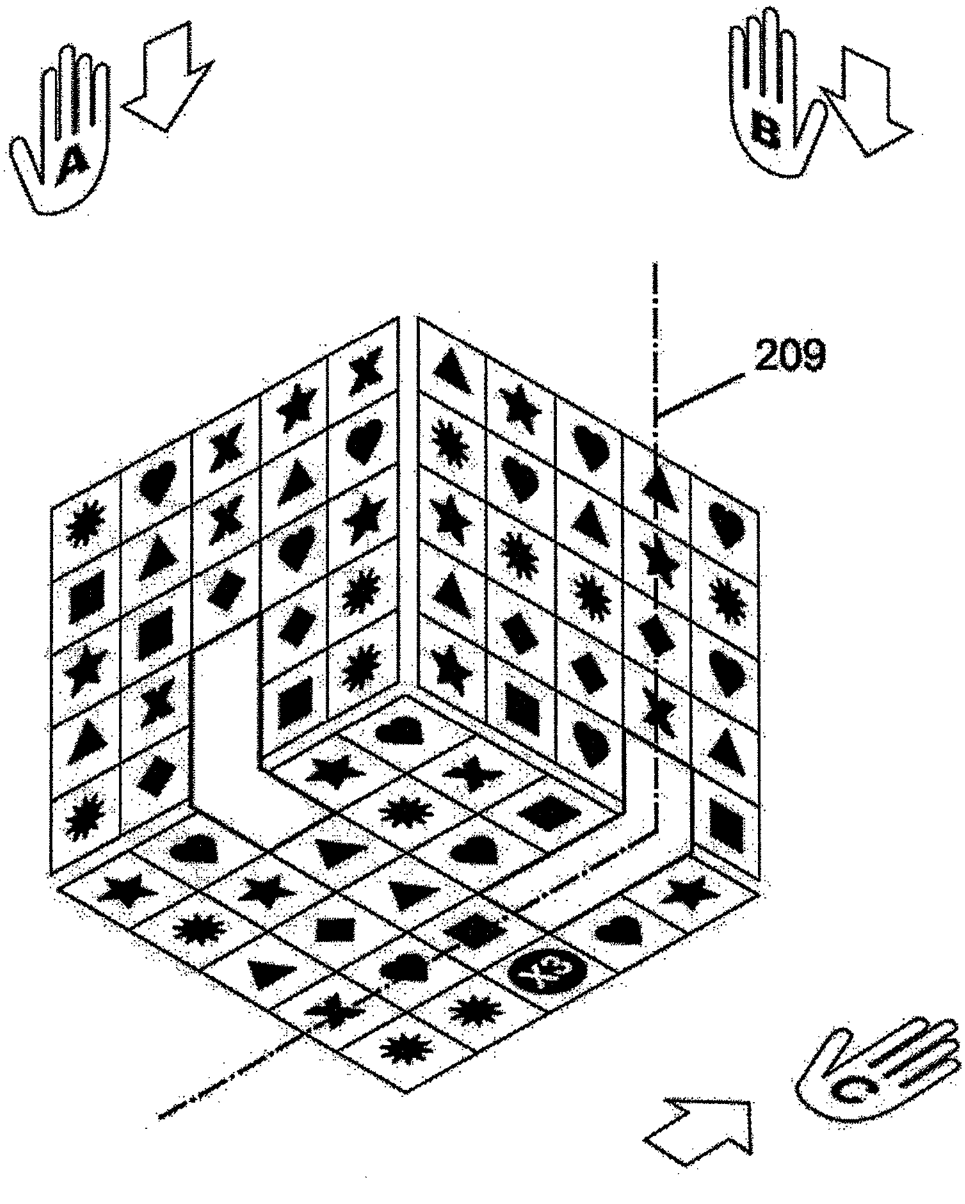
Figure 9D:
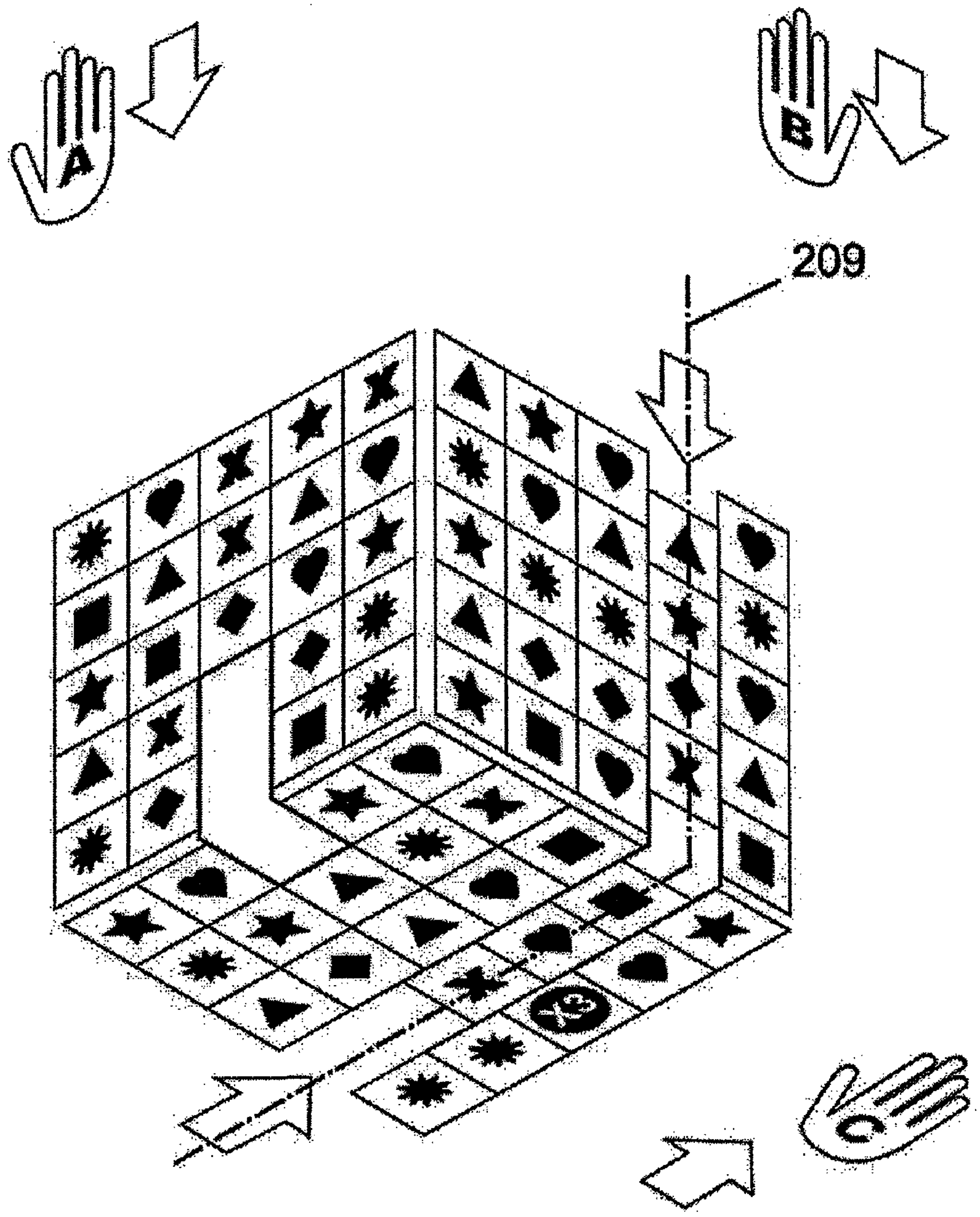
Figure 9E:
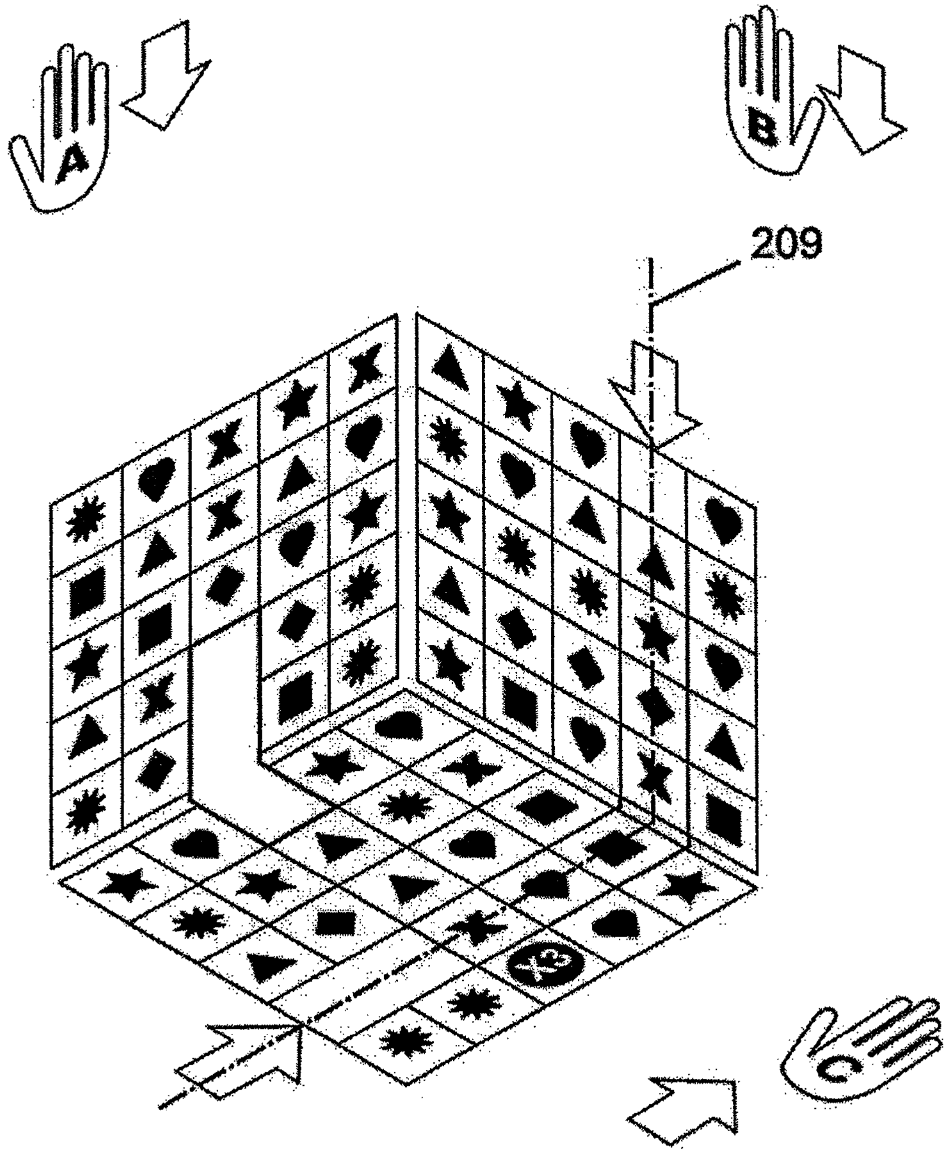
Figure 9F:
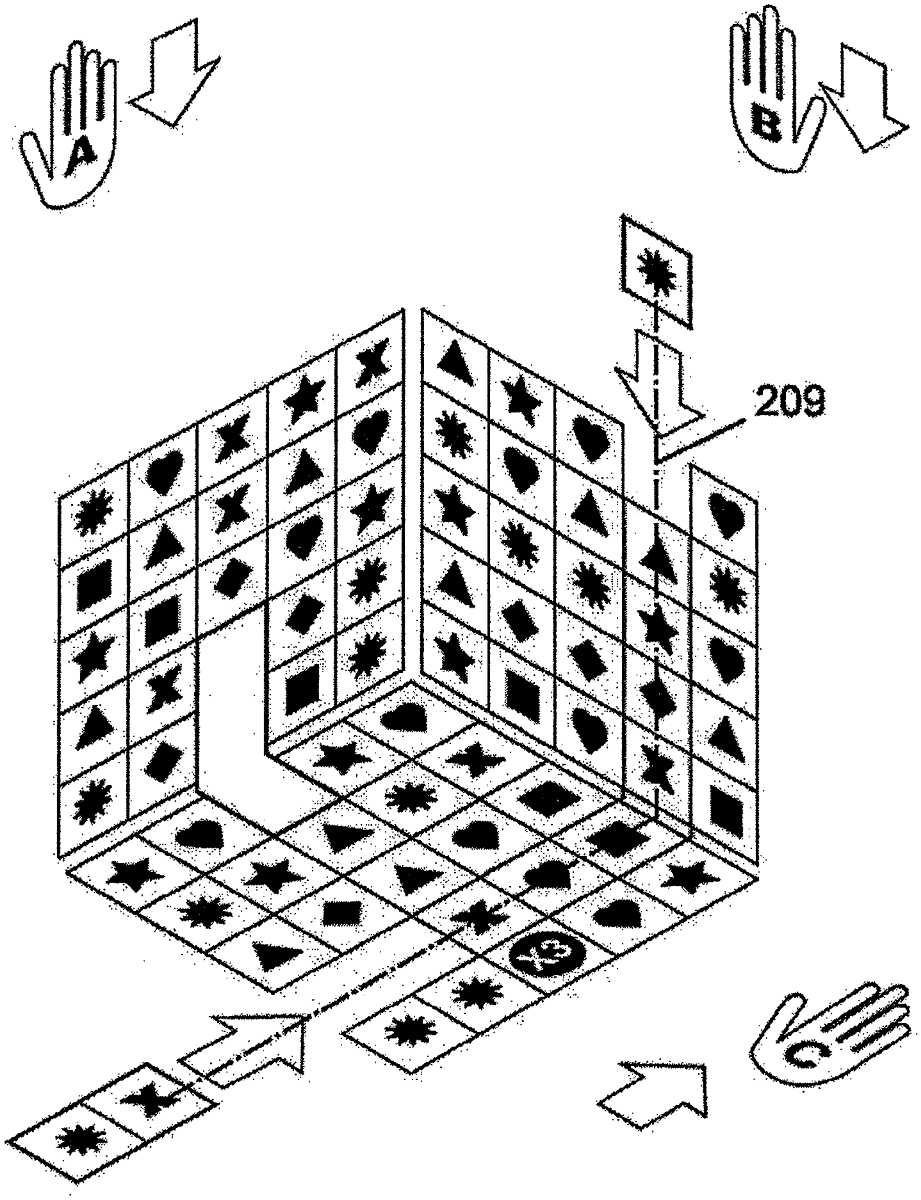
Figure 9G:
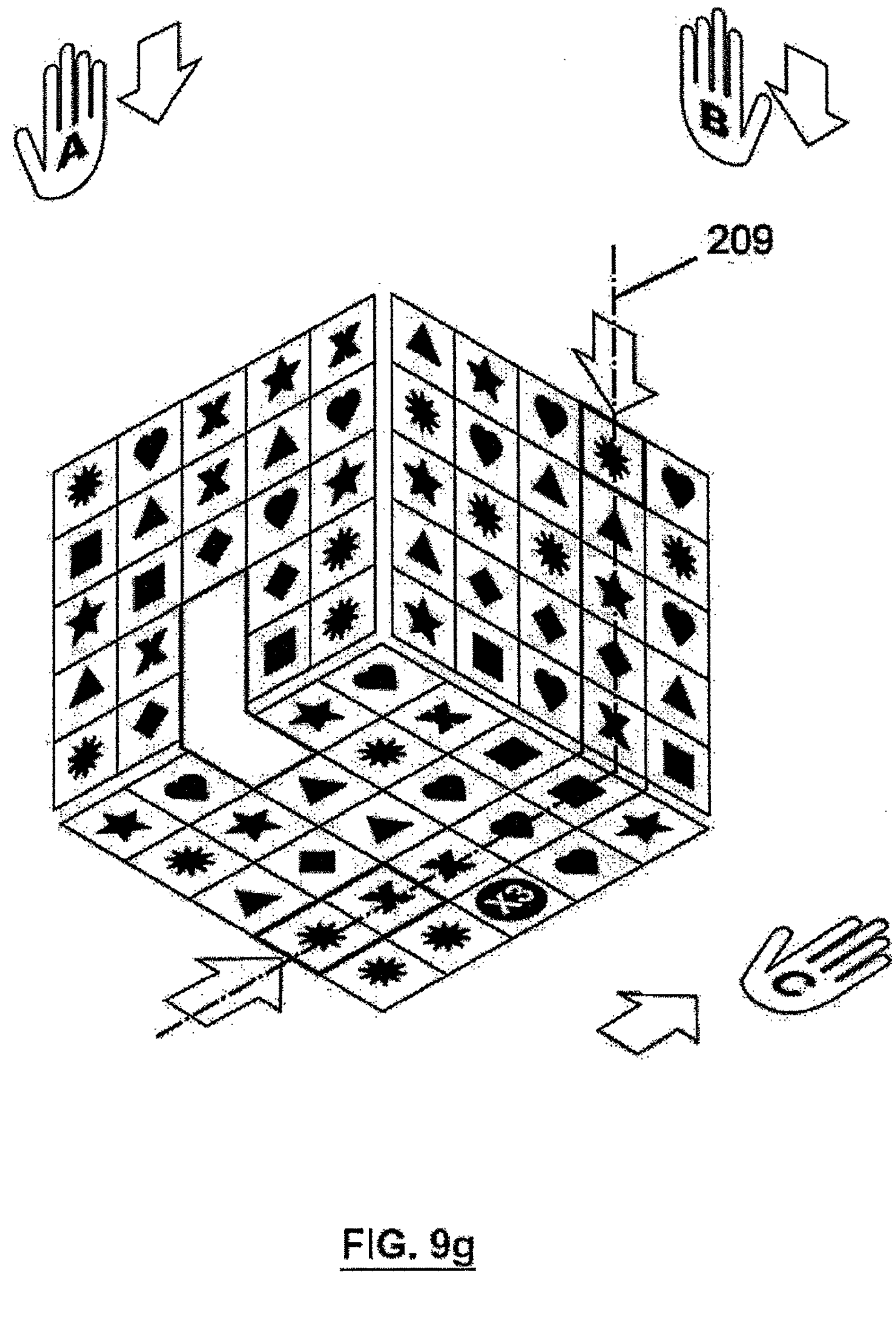

In a preferred embodiment, once all winning combinations have been determined, the game continues by eliminating all symbols that were included in any winning combination and then refilling the empty squares. The empty squares are refilled through a two-step process: First, there is a shift of the remaining squares, and then, there is a random regeneration of symbols based on the relative likelihoods, as at the outset. In a preferred embodiment, for each of face A and face B, the shift of squares is downward, from top to bottom; and in the case of face C, when a symbol is eliminated, the shift is from bottom to top, along the same line as the line containing the winning combination. So, for example, referring to FIGS. 9*a* and 9*b*, suppose that there is a three-sun winning combination in betting line 209 (i.e., the second column from the right on face B and continuing onto face C) that begins with the fifth square from the top of betting line 209 and also includes the sixth and seventh squares from the top (note that the fifth square is in face A, whereas the sixth and seventh squares are in face C). This three-sun combination is highlighted in FIG. 9*b*. The player is first credited for this winning combination and the squares in that winning combination are eliminated, as shown in FIG. 9*c*. Then, referring to FIG. 9*d*, the four squares at the top of betting line 209 will shift downward by one square each, and the three squares at the bottom of betting line 209 will shift upward by two squares each. Referring to FIG. 9*e*, these shifts will leave one empty square at the top of betting line 209 and two empty squares at the bottom of betting line 209, which will then be filled by random generation of new symbols according to the a priori relative likelihood for each symbol, as shown in FIGS. 9*f* and 9*g*.

Figure 9H:
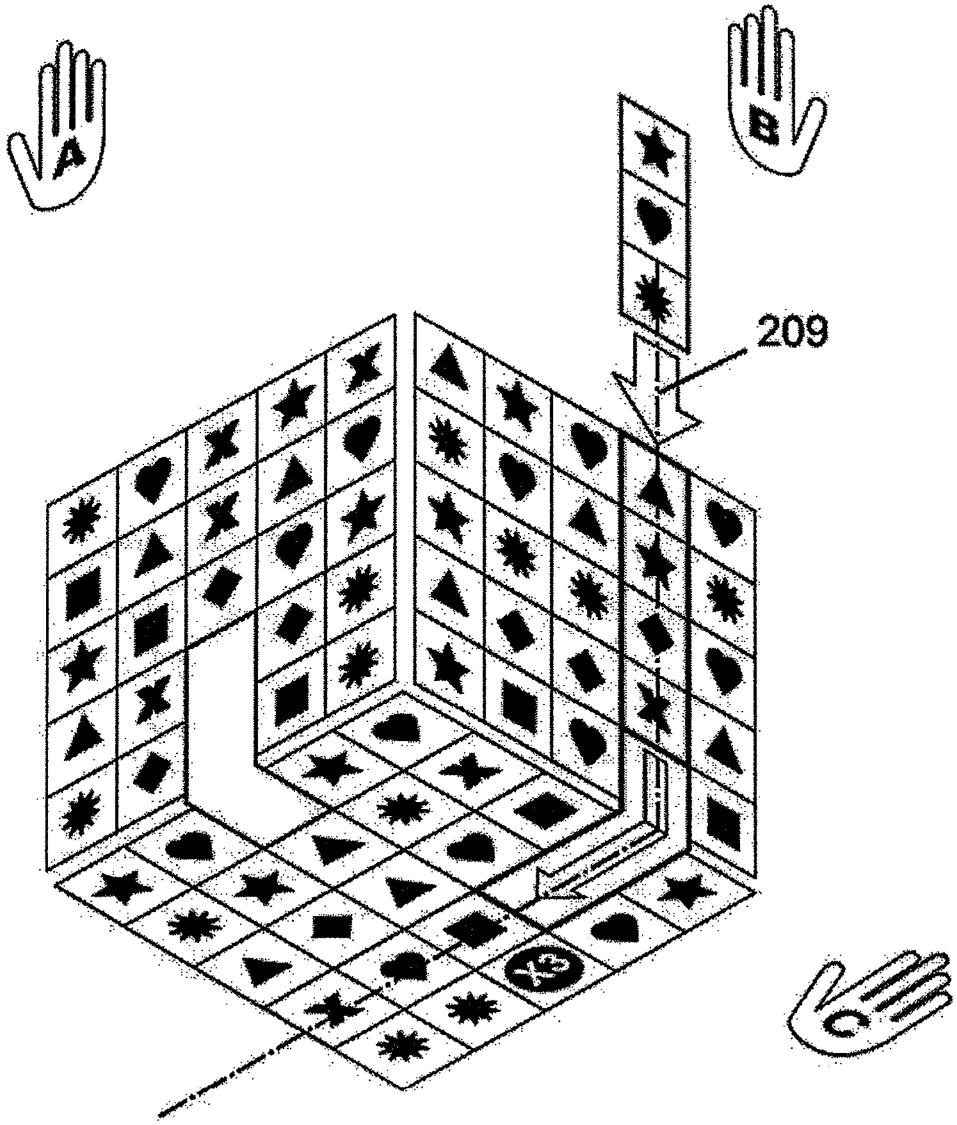
Figure 9I:
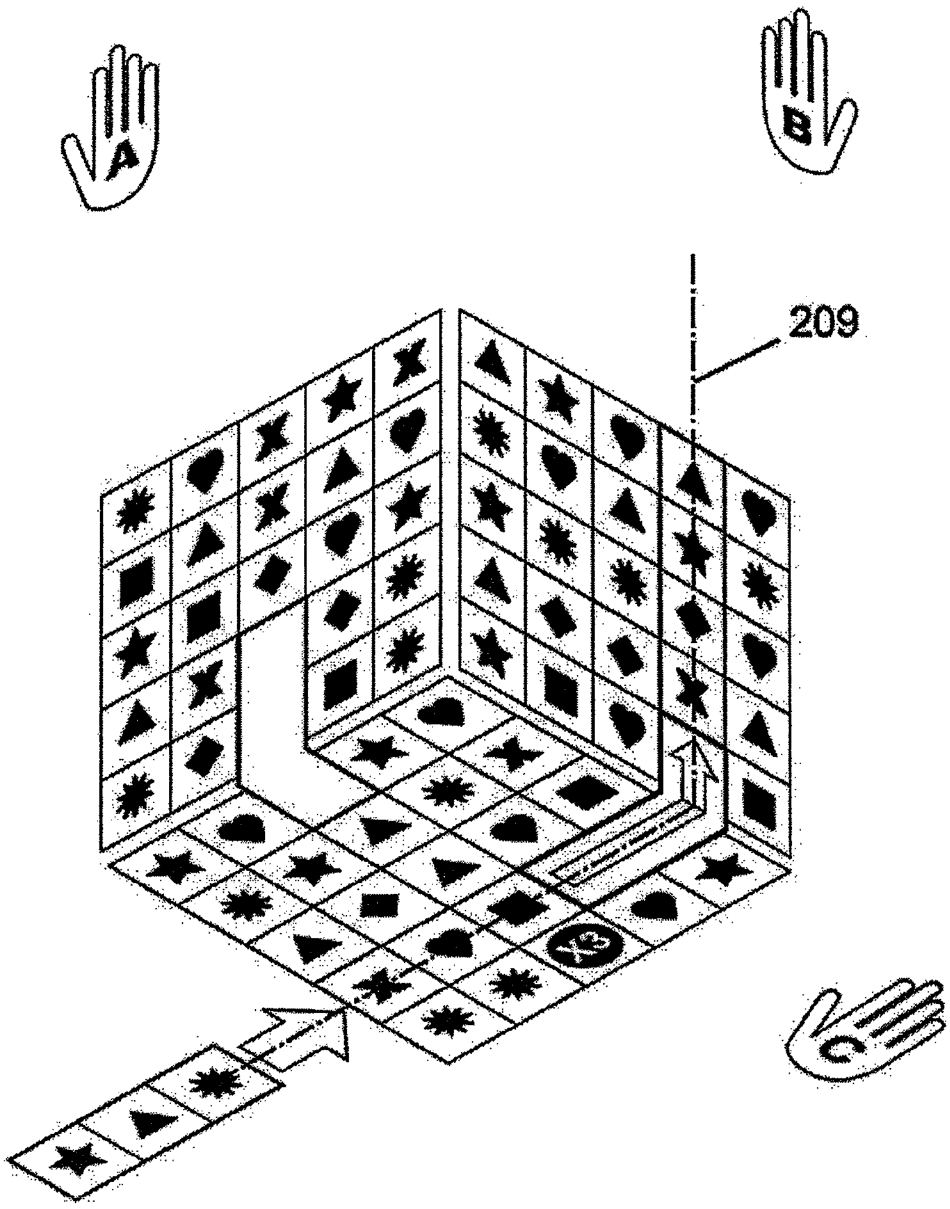

Alternatively, the shifting of squares may involve shifting squares from one face to another (e.g., from face B to face C, or from face C to face B). In one alternative embodiment, referring to FIG. 9*h*, one or more squares are shifted from face B to face C when there is one or more eliminated square on face C. As seen in FIG. 9*h*, there are three eliminated squares in betting line 209. Two of the eliminated squares are on face C and one is on face B. In this embodiment, the four squares at the top of betting line 209 may be shifted downward by three squares each, resulting in two squares being shifted from face B to face C. The three newly eliminated squares at the top of betting line 209 may be refilled by random generation of new symbols. In another alternative embodiment, referring to FIG. 9*i*, one or more squares are shifted from face C to face B when there is one or more eliminated square on face B. As seen in FIG. 9*i*, there are three eliminated squares in betting line 209. Two of the eliminated squares are on face C and one is on face B. In this embodiment, the three squares at the bottom of betting line 209 may be shifted upward by three squares each, resulting in one square being shifted from face C to face B. The three newly eliminated squares at the bottom of betting line 209 may be refilled by random generation of new symbols.

When a shift and a random regeneration of new symbols occurs, the newly generated game cube is once again examined for winning combinations. This process may be repeated indefinitely, so long as winning combinations continue to occur. However, typically, there will come a point at which there are no winning combinations—in fact, this may occur in the very first display of the game cube.

Figure 5A:
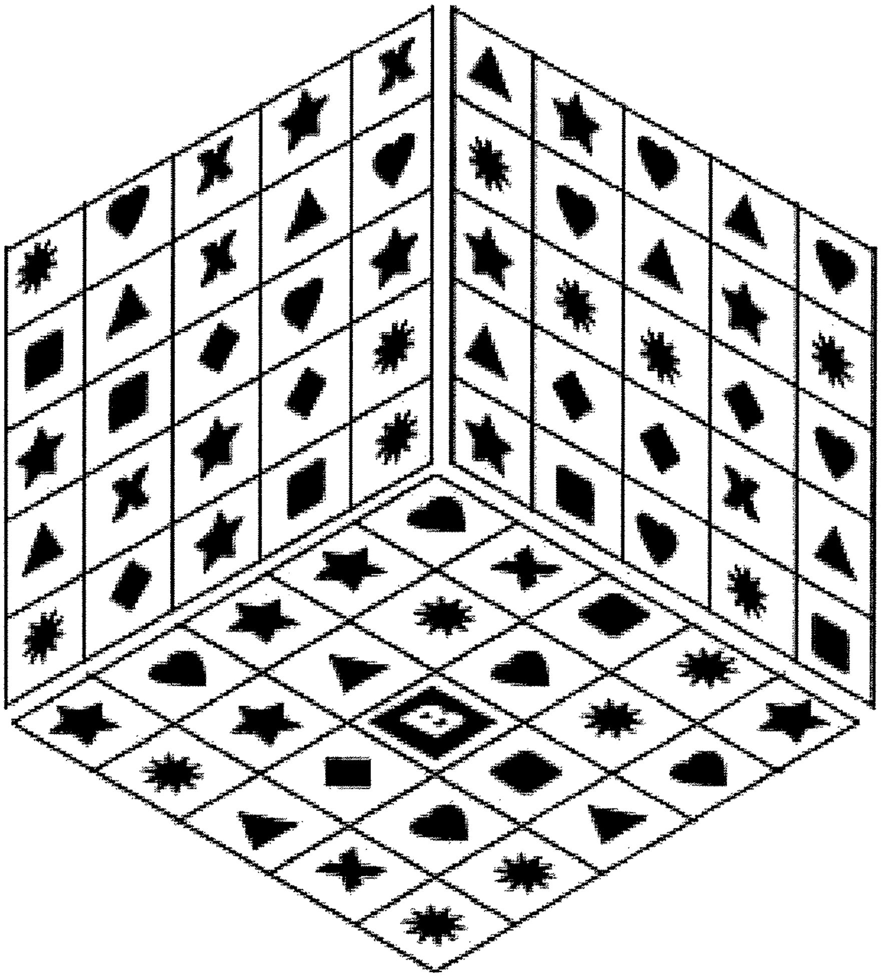
FIGS. 5*a*-5*f* are exemplary displays of a game cube that illustrate an exemplary set of bomb symbol types and the squares to which each bomb type relates as used in a video game according to a preferred embodiment of the invention.
Figure 5B:
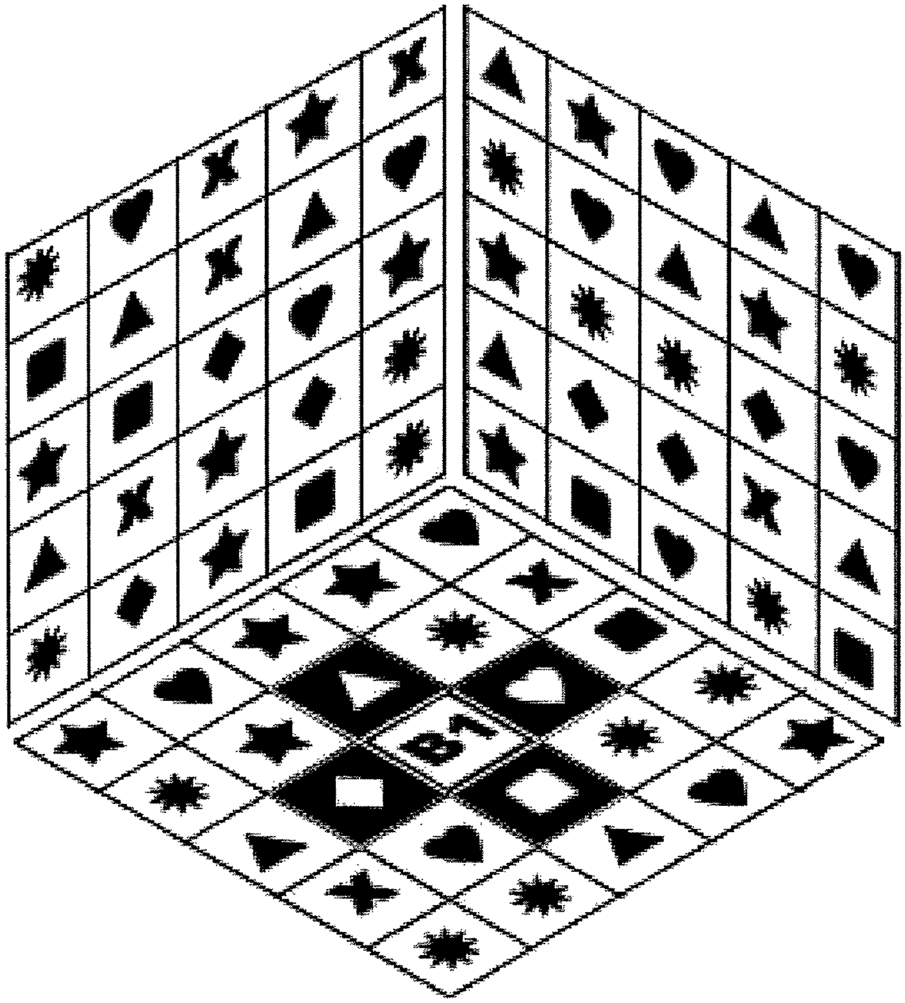
Figure 5C:
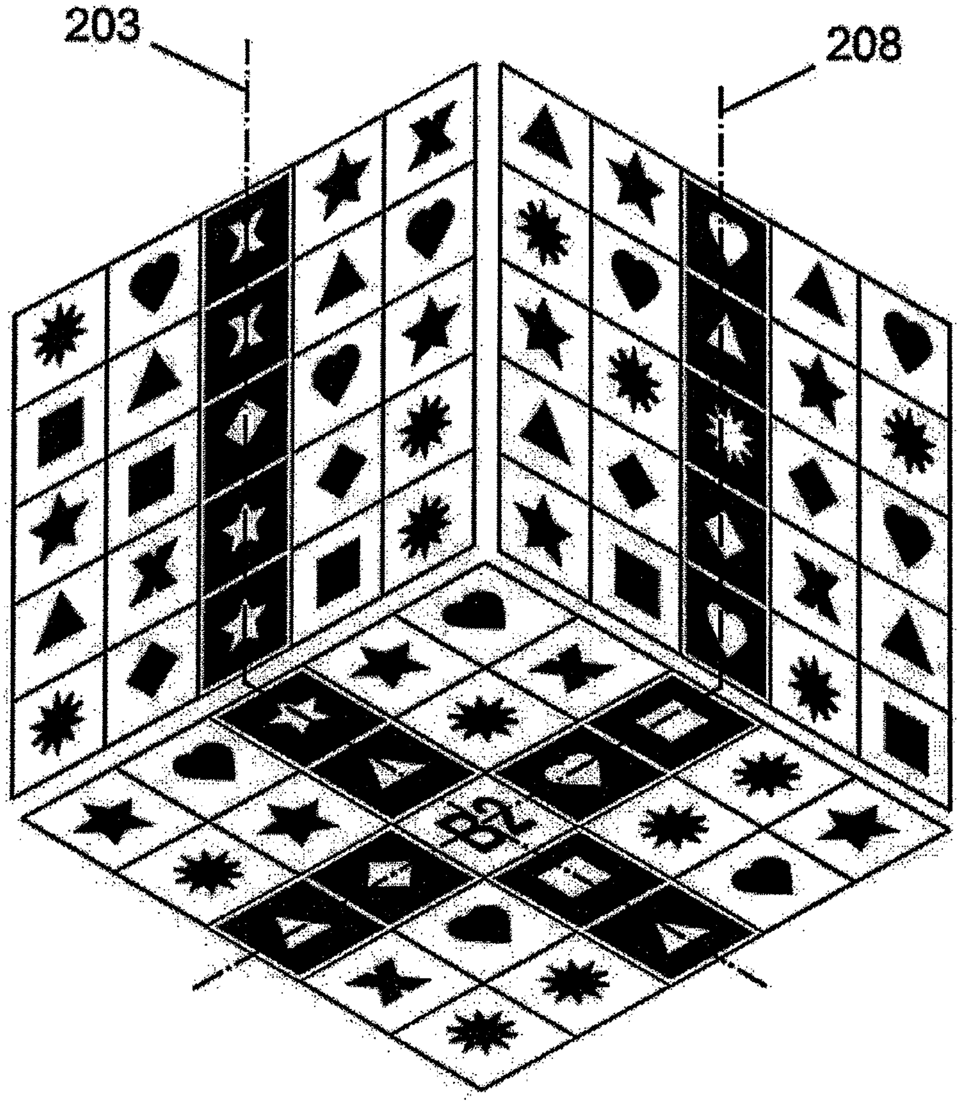

In the event that there are no winning combinations, the next step is to determine whether there are any bomb symbols present. The significance of a bomb symbol is that when the bomb "explodes", the bomb has the effect of eliminating itself plus all squares that relate to that bomb. Accordingly, referring to FIGS. 5*a*-5*f*, in a preferred embodiment, there are five types of bomb symbols. Referring to FIG. 5*b*, a small cross bomb relates to the four squares that are immediately laterally adjacent to the square containing the bomb symbol, as indicated by the "B1" symbol and the four highlighted squares that are laterally adjacent to it. It is noted that if the small cross bomb appears in one of the three squares that are in the respective corners of the faces at the center of the diagram, or in one of the 27 squares along the perimeter of the diagram, the small cross bomb will relate to either the two or three squares that are immediately laterally adjacent to the bomb symbol square. Referring to FIG. 5*c*, a large cross bomb relates to all squares in both betting lines in which that cross bomb resides (this is always a total of 19 squares, including the bomb symbol square itself), as indicated by the B2 symbol and the highlighted squares. Thus, if there are no winning combinations but there is a cross bomb that resides, for example, in betting lines 203 and 208, then that cross bomb will explode, thereby causing all of the squares in betting lines 203 and 208 to be eliminated. After such an elimination of squares, the shift-and-replace algorithm is applied as described above with respect to the elimination of squares associated with winning combinations. The process then repeats as described previously.

Figure 5D:
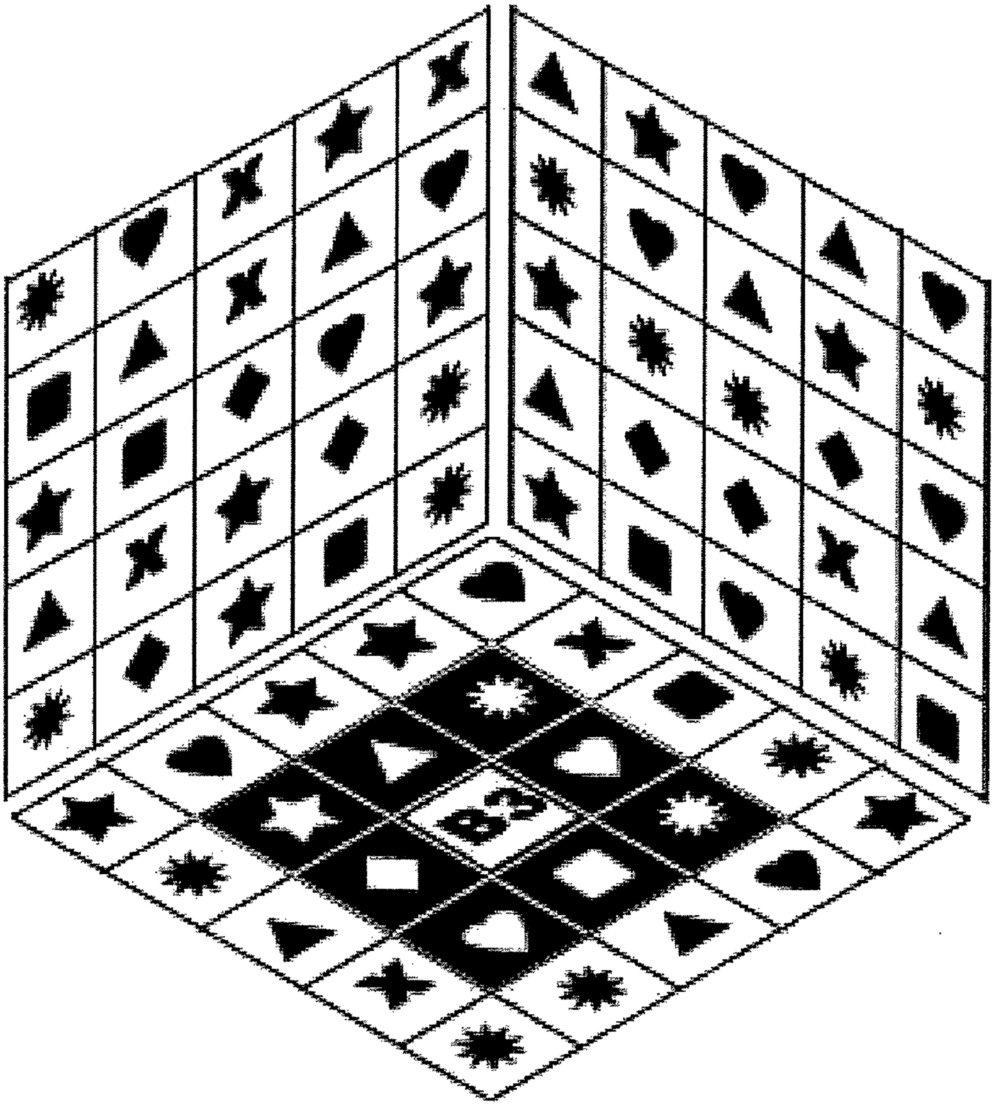
Figure 5E:
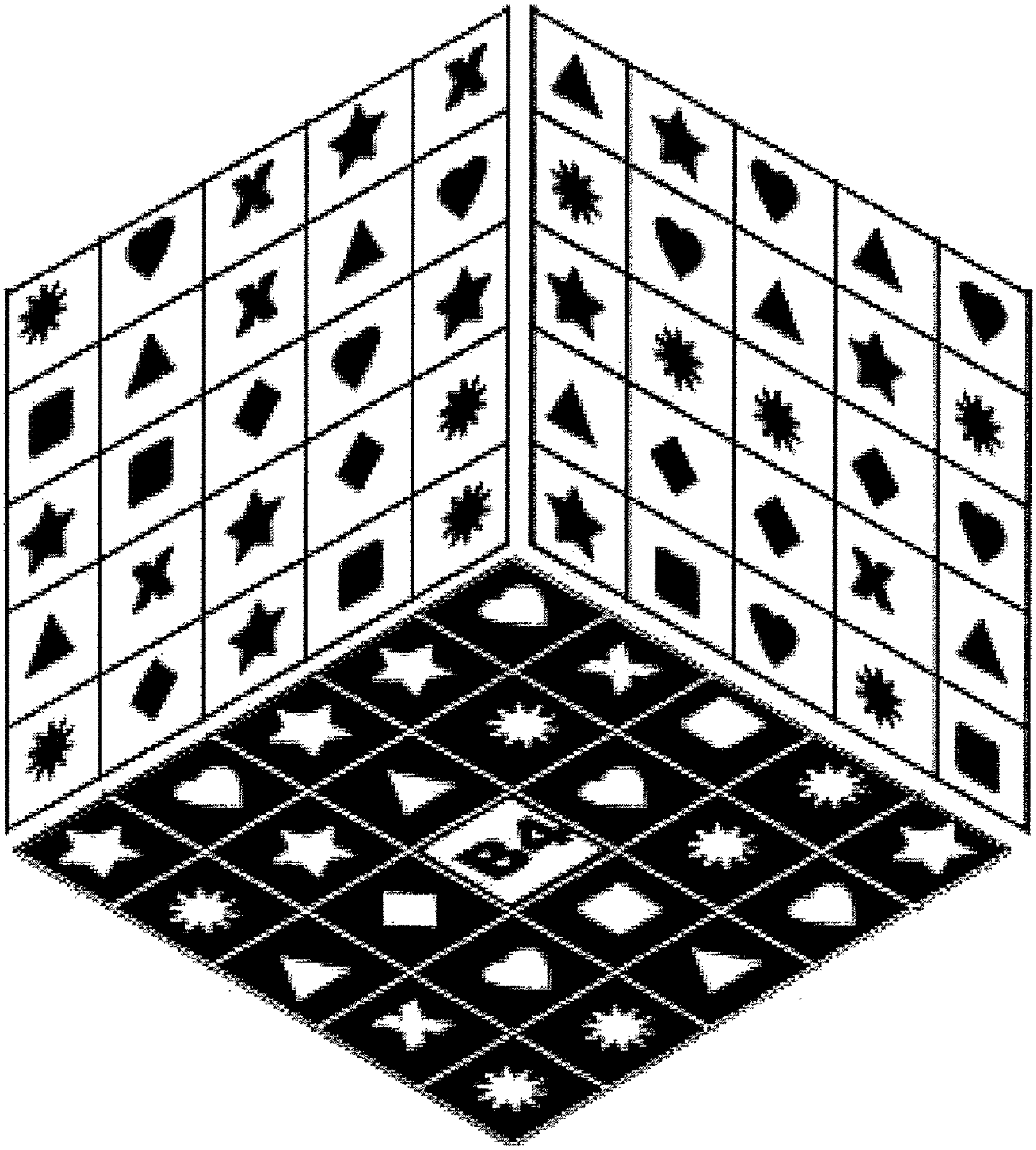
Figure 5F:
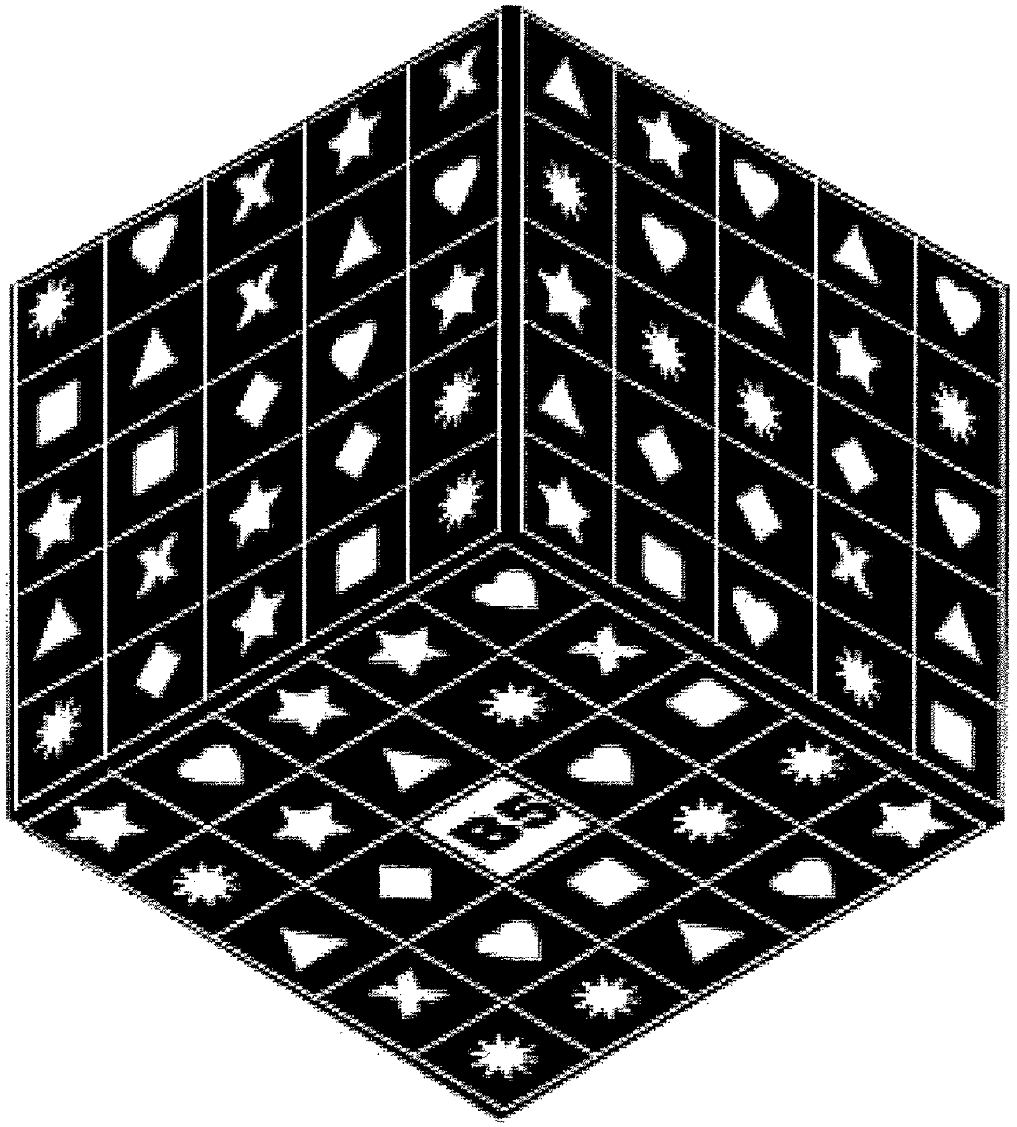

Referring to FIG. 5*d*, a small field bomb relates to the eight squares that surround the bomb symbol, i.e., the squares that are either immediately laterally adjacent or immediately diagonally adjacent. These are indicated by the highlighted squares in FIG. 5*d*. It is noted that if the small field bomb appears in one of the three squares that are in the respective corners of the faces at the center of the diagram, or in one of the 27 squares along the perimeter of the diagram, the small field bomb will relate to either the three, five, or seven squares that surround the bomb symbol square. Referring to FIG. 5*e*, a large field bomb, or section bomb, or face bomb, relates to all squares in its face. So, when a field bomb in face C explodes, all 25 squares in face C are eliminated, and they are replaced by random regeneration. Referring to FIG. 5*f*, a total bomb relates to all 75 squares in the entire game cube. So, when a total bomb explodes, all 75 squares are eliminated and replaced by random regeneration, similar as is done at the outset of the game.

The game ends when there are no winning combinations and no bomb symbols.

Figure 6:
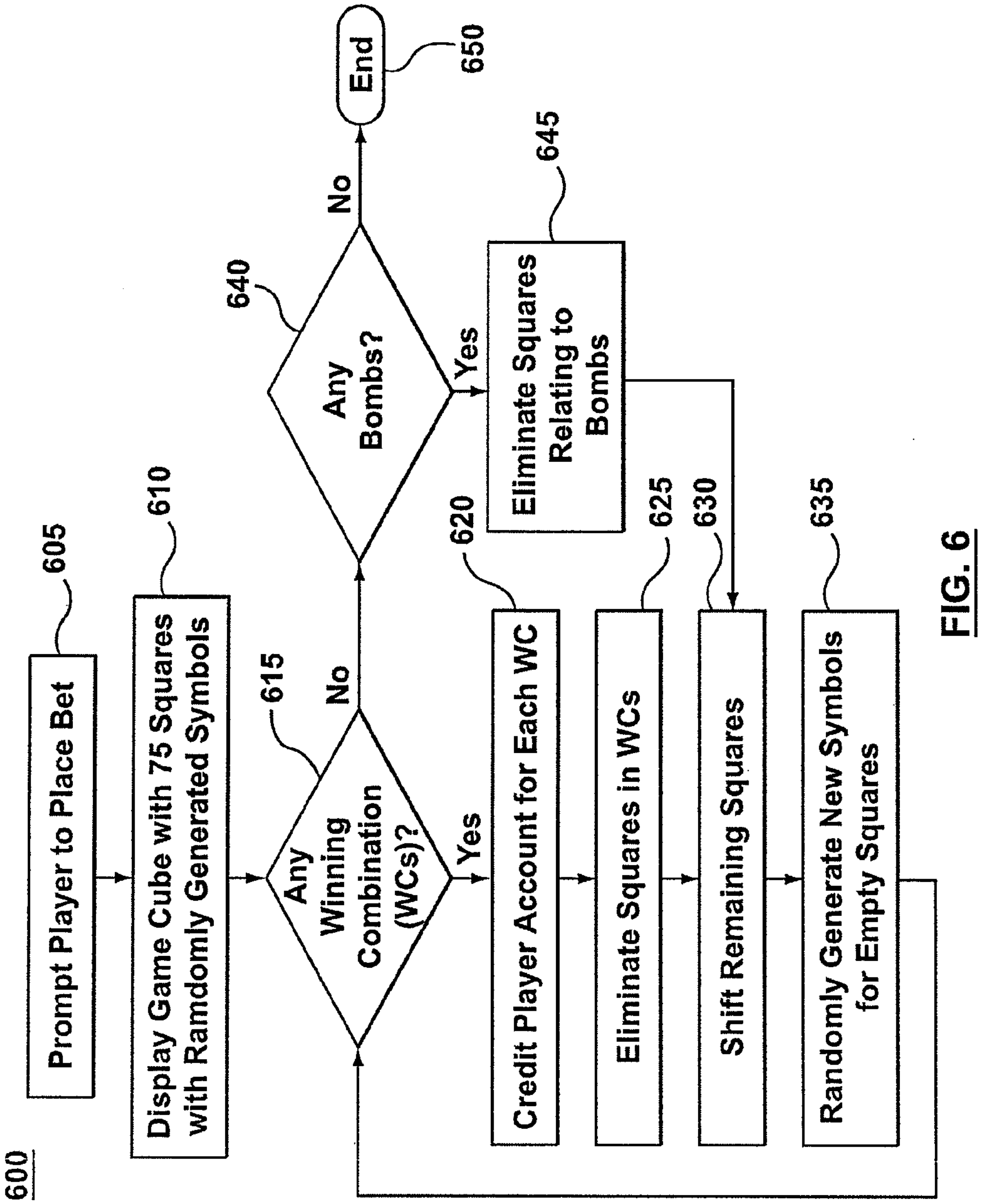
FIG. 6 is a flow chart that illustrates an exemplary process for enabling a computer use to play an online version of a video game, according to a preferred embodiment of the invention.

Referring to FIG. 6, a flow chart illustrates a process 600 of enabling a player to play a video game according to a preferred embodiment of the invention. At step 605, the game begins by prompting the player to place a bet. Once the player has placed a bet, then at step 610, a game cube is displayed. The game cube includes three mutually orthogonal faces, i.e., the A, B, and C faces as shown in FIG. 2. Each face includes 25 squares arranged in a five-by-five configuration. Each of the squares includes a symbol that is either a bomb symbol, a multiplier symbol, or an ordinary symbol. The relative probability that any particular symbol will appear in a given square is given by a predetermined likelihood table (see, for example, Table 1).

Once the game cube is displayed, a determination is made at step 615 as to whether any winning combinations exist. In a preferred embodiment, any combination of at least three consecutive squares that each include either the same ordinary symbol or the same ordinary symbol plus at least one multiplier symbol constitutes a winning combination. In this manner, the multiplier symbol is treated as being a wild card symbol. If it is determined that there is at least one winning combination, then the player account is credited at step 620. The amount of the credit is based on the amount of the original bet, the nominal payout for the specific winning combination, and the possibility of a bonus based on the presence of at least one dice symbol within the winning combination. The nominal payout amounts for each possible winning combination are predetermined (see, for example, Table 2).

Once the player account has been credited at step 620, the squares included in all winning combinations are eliminated at step 625. The remaining squares are shifted at step 630 in the manner previously described. Finally, at step 635, new symbols are randomly generated using the same relative probability chart as that used in generating the original game cube, and these new symbols are used to fill the squares that are empty as a result of the shift at step 630. In this manner, a new game cube is displayed, and the algorithm then repeats by returning to step 615 to determine once again whether any winning combinations are present.

In the event that it is determined at step 615 that there are no winning combinations present in the entire game cube, then the algorithm skips to step 640 to determine whether any bomb symbols are present. If at least one bomb symbol is present, then selected squares relating to that bomb symbol(s) are eliminated at step 645. As previously described with respect to FIG. 5*b*, if a small cross bomb symbol is present, then that square and the two, three, or four immediately laterally adjacent squares are eliminated at step 645. As previously described with respect to FIG. 5*c*, if a large cross bomb symbol is present, then all squares in both betting lines in which that cross bomb symbol resides (a total of 19 squares) are eliminated at step 645. As previously described with respect to FIG. 5*d*, if a small field bomb is present, then that square and the three, five, seven, or eight immediately adjacent squares (i.e., both laterally adjacent and diagonally adjacent) are eliminated at step 645. If a large field bomb symbol is present, then all 25 symbols in the same face as the face in which that field bomb symbol resides are eliminated at step 645. If a total bomb symbol is present, then all 75 symbols in the entire game cube are eliminated at step 645. After the elimination of the appropriate squares at step 645, the algorithm proceeds to step 630 to shift the remaining squares as described above, and then to step 635 to randomly generate new symbols for the empty squares, and then back to step 615 to determine again whether any winning combinations are present.

When it is determined at step 615 that there are no winning combinations present, and then it is determined at step 640 that there are no bomb symbols present, then the game ends at step 650. The player account thus includes winnings from any winning combinations less the amount of the original bet. Of course, if there were no winning combinations, the player loses the entire amount of the original bet.

While the present invention has been described with respect to what is presently considered to be the preferred embodiment, it is to be understood that the invention is not limited to the disclosed embodiments. To the contrary, the invention is intended to cover various modifications and equivalent arrangements included within the spirit and scope of the appended claims. For example, alternative embodiments may include the use of game cubes having faces that each have a three-by-three arrangement of squares, a four-by-four arrangement of squares, a six-by-six arrangement of squares, a seven-by-seven arrangement of squares, and so forth, instead of the five-by-five arrangements described above. In other alternative embodiments, the number of types of colored squares may be varied, and various configurations of squares may be credited as being winning combinations. The scope of the following claims is to be accorded the broadest interpretation so as to encompass all such modifications and equivalent structures and functions.

What is claimed is:

1. An apparatus for enabling a player to play a video game, the apparatus comprising an electronic client device, and the electronic client device being in communication with a network server, wherein the electronic client device is configured to:

a) prompt the player to indicate an amount of a bet;

b) display a three-dimensional cube, the cube comprising at least two mutually orthogonal faces, each face comprising $N^2$ squares arranged in an N×N configuration, wherein N is a whole number greater than 1, wherein each of the squares is populated by one of a plurality of symbols, wherein a predetermined portion of the squares defines at least one betting line, wherein the squares in the at least one betting line are located on the at least two faces of the cube;

c) determine whether the at least one betting line comprises a winning combination;

d) if the at least one betting line comprises the winning combination, i) provide a predetermined credit to the player, the amount of the predetermined credit being related to the specific winning combination;

ii) eliminate all squares that are part of the winning combination;

iii) shift the remaining squares to replace at least a portion of the squares eliminated in step (ii) by shifting at least one square from one face visible to the player to another orthogonal face visible to the player; and iv) replace the empty squares by randomly generating new squares, wherein each new square is populated by one of the plurality of symbols; and e) repeat steps c) and d) until there is no winning combination in the at least one betting line.

2. The apparatus of claim 1, wherein the electronic client device comprises a client computer.

3. The apparatus of claim 2, wherein the client computer is in communication with the network server via the Internet.

4. The apparatus of claim 1, wherein the electronic client device comprises a client monitor, wherein the monitor is configured to receive inputs from a keyboard.

5. The apparatus of claim 1, wherein the electronic client device comprises a client monitor, wherein the monitor is configured to receive inputs from a mouse.

6. The apparatus of claim 1, wherein the electronic client device comprises a client monitor, wherein the monitor is configured to receive inputs from a joystick device.

7. The apparatus of claim 1, wherein each of the plurality of symbols is selected from a group comprising: an ordinary symbol, a multiplier symbol, and a bomb symbol.

8. The apparatus of claim 7, wherein the client device is further configured to, for each bomb symbol:

A) eliminate all squares relating to the bomb symbol;

B) shift the remaining squares in the predetermined manner;

C) replace the empty squares by randomly generating new squares, wherein each new square is populated by one symbol from the plurality of symbols; and D) if at least one of the squares is populated by the at least one bomb symbol, repeat steps A) to C).

9. The apparatus of claim 8, wherein the at least two mutually orthogonal faces comprise three mutually orthogonal faces, wherein the three faces include a top-left face, a top-right face, and a bottom face, and wherein N is greater than three, and wherein the top-left face and the bottom face together form N betting lines, each betting line comprising a column of N squares on the top-left face and an adjacent column of N squares on the bottom face, and the top-right face and the bottom face together form N betting lines, each betting line comprising a column of N squares on the top-right face and an adjacent row of N squares on the bottom face, and the top-left face and the top-right face together form N betting lines, each betting line comprising a row of N squares on the top-left face and an adjacent row of N squares on the top-right face, and wherein a combination of at least three consecutive squares within a single betting line having either a same ordinary symbol or a same ordinary symbol and at least one multiplier symbol constitutes a winning combination.

10. The apparatus of claim 9, wherein the predetermined manner in which the squares are shifted further comprises the following:

for the bottom face, a leftward shift of each square that is to the right of and in the same betting line as an eliminated square;

for the top-right face, a downward shift of each square that is above and in the same betting line as an eliminated square, wherein the downward shift comprises a shift of at least one square from the top-right face to the bottom face when the bottom face comprises at least one eliminated square; and for the top-left face, a downward shift of each square that is above and in the same betting line as an eliminated square.

11. The apparatus of claim 10, wherein the at least one multiplier symbol is associated with an integer and when a winning combination includes the at least one multiplier symbol, the amount of the predetermined credit is equal to a sum of the integers associated with each multiplier symbol within the winning combination multiplied by the amount of the predetermined credit for the corresponding combination of at least three squares having the same ordinary symbol with no multiplier symbols.

12. The apparatus of claim 10, wherein each ordinary symbol is selected from the group consisting of a red symbol, a yellow symbol, a brown symbol, a blue symbol, a green symbol, an orange symbol, and a purple symbol.

13. The apparatus of claim 10, wherein each multiplier symbol is selected from the group consisting of X1, X2, X3, X4, X5, and X6.

14. The apparatus of claim 10, wherein each bomb symbol is selected from the group consisting of a cross bomb symbol, a field bomb symbol, and a total bomb symbol.

15. The apparatus of claim 14, wherein the cross bomb symbol relates to all squares in each of the two betting lines that contain the cross bomb symbol.

16. The apparatus of claim 14, wherein the field bomb symbol relates to all squares located on the same face that contains the field bomb symbol.

17. The apparatus of claim 14, wherein the total bomb symbol relates to all squares located on the three faces.

18. A method of conducting a video game, the method comprising the steps of:

a) prompting a user to indicate an amount of a bet;

b) displaying a three-dimensional cube, the cube comprising at least two mutually orthogonal faces, each face comprising $N^2$ squares arranged in an N×N configuration, wherein N is a whole number greater than 1, wherein each of the squares is populated by one of a plurality of symbols, wherein a predetermined portion of the squares defines at least one betting line, wherein the squares in the at least one betting line are located on the at least two faces of the cube;

c) determining whether the at least one betting line comprises a winning combination;

d) if the at least one betting line comprises the winning combination, i) providing a predetermined credit to the player, the amount of the predetermined credit being related to the specific winning combination;

ii) eliminating all squares that are part of the winning combination;

iii) shifting the remaining squares to replace at least a portion of the squares eliminated in step (ii) by shifting at least one square from one face visible to the player to another orthogonal face visible to the player; and iv) replacing the empty squares by randomly generating new squares, wherein each new square is populated by one of the plurality of symbols; and e) repeating steps c) and d) until there is no winning combination in the at least one betting line.

19. The method of claim 18, wherein each of the plurality of symbols is selected from a group comprising: an ordinary symbol, a multiplier symbol, and a bomb symbol.

20. The method of claim 19, wherein, for each bomb symbol, the method further comprises the steps of:

A) eliminating all squares relating to the bomb symbol;

B) shifting the remaining squares in the predetermined manner;

C) replacing the empty squares by randomly generating new squares, wherein each new square is populated by one symbol from the plurality of symbols; and D) if at least one of the squares is populated by the at least one bomb symbol, repeating steps A) to C).

21. The method of claim 20, wherein the at least two mutually orthogonal faces comprise three mutually orthogonal faces, wherein the three faces include a top-left face, a top-right face, and a bottom face, and wherein N is greater than three, and wherein the top-left face and the bottom face together form N betting lines, each betting line comprising a column of N squares on the top-left face and an adjacent column of N squares on the bottom face, and the top-right face and the bottom face together form N betting lines, each betting line comprising a column of N squares on the top-right face and an adjacent row of N squares on the bottom face, and the top-left face and the top-right face together form N betting lines, each betting line comprising a row of N squares on the top-left face and an adjacent row of N squares on the top-right face, and wherein a combination of at least three consecutive squares within a single betting line having either a same ordinary symbol or a same ordinary symbol and at least one multiplier symbol constitutes a winning combination.

22. The method of claim 21, wherein the step of shifting the remaining squares in a predetermined manner further comprises the following:

for the bottom face, leftwardly shifting each square that is to the right of and in the same betting line as an eliminated square;

for the top-right face, downwardly shifting each square that is above and in the same betting line as an eliminated square, wherein the downwardly shifting comprises shifting at least one square from the top-right face to the bottom face when the bottom face comprises at least one eliminated square; and for the top-left face, downwardly shifting each square that is above and in the same betting line as an eliminated square.

23. The method of claim 22, wherein the at least one multiplier symbol is associated with an integer and when a winning combination includes the at least one multiplier symbol, the amount of the predetermined credit is equal to a sum of the integers associated with each multiplier symbol within the winning combination multiplied by the amount of the predetermined credit for the corresponding combination of at least three squares having the same ordinary symbol with no multiplier symbols.

24. The method of claim 22, wherein each ordinary symbol is selected from the group consisting of a red symbol, a yellow symbol, a brown symbol, a blue symbol, a green symbol, an orange symbol, and a purple symbol.

25. The method of claim 22, wherein each multiplier symbol is selected from the group consisting of X1, X2, X3, X4, X5, and X6.

26. The method of claim 22, wherein each bomb symbol is selected from the group consisting of a cross bomb symbol, a field bomb symbol, and a total bomb symbol.

27. The method of claim 26, wherein the cross bomb symbol relates to all squares in each of the two betting lines that contain the cross bomb symbol.

28. The method of claim 26, wherein the field bomb symbol relates to all squares located on the same face that contains the field bomb symbol.

29. The method of claim 26, wherein the total bomb symbol relates to all squares located on the three faces.

30. A gaming device for playing a video game, the gaming device comprising:

a display; and a plurality of buttons configured to communicate with the display, wherein the display and the plurality of buttons are configured to:

a) prompt a user to indicate an amount of a bet;

b) display a three-dimensional cube, the cube comprising at least two mutually orthogonal faces, each face comprising $N^2$ squares arranged in an N×N configuration, wherein N is a whole number greater than 1, wherein each of the squares is populated by one of a plurality of symbols, wherein a predetermined portion of the squares defines at least one betting line, wherein the squares in the at least one betting line are located on the at least two faces of the cube;

c) determine whether the at least one betting line comprises a winning combination;

d) if the at least one betting line comprises the winning combination, i) provide a predetermined credit to the player, the amount of the predetermined credit being related to the specific winning combination;

ii) eliminate all squares that are part of the winning combination;

iii) shift the remaining squares to replace at least a portion of the squares eliminated in step (ii) by shifting at least one square from one face visible to the player to another orthogonal face visible to the player; and iv) replace the empty squares by randomly generating new squares, wherein each new square is populated by one of the plurality of symbols; and e) repeat steps c) and d) until there is no winning combination in the at least one betting line.

* * * * *